(12) United States Patent
Oota

(10) Patent No.: US 8,467,085 B2
(45) Date of Patent: Jun. 18, 2013

(54) IMAGE PROCESSING APPARATUS, DATA AMOUNT REDUCING METHOD, AND DATA AMOUNT REDUCING PROGRAM EMBODIED ON COMPUTER READABLE MEDIUM

(75) Inventor: Yuko Oota, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 790 days.

(21) Appl. No.: 12/646,709

(22) Filed: Dec. 23, 2009

(65) Prior Publication Data

US 2010/0253953 A1 Oct. 7, 2010

(30) Foreign Application Priority Data

Dec. 26, 2008 (JP) ................................. 2008-333716

(51) Int. Cl.
*G06K 15/00* (2006.01)

(52) U.S. Cl.
USPC .......... 358/1.16; 358/1.9; 358/1.17; 358/523; 358/426.05

(58) Field of Classification Search
None
See application file for complete search history.

(56) References Cited

U.S. PATENT DOCUMENTS 5,867,634 A * 2/1999 Hirota et al. .................. 358/1.2
6,668,102 B2 * 12/2003 Chiba et al. ................... 382/305
7,561,749 B2 * 7/2009 Tamura et al. ................ 382/239
7,602,523 B2 * 10/2009 Kugo ............................. 358/1.2
8,055,079 B2 * 11/2011 Morimoto et al. ............ 382/209
2005/0180645 A1 8/2005 Hasegawa et al.
2008/0030812 A1 2/2008 Mori

FOREIGN PATENT DOCUMENTS

| EP | 1 555 804 | | 7/2005 |
| JP | 2001045438 A | * | 2/2001 |
| JP | 2001-143074 | | 5/2001 |
| JP | 2005-204206 A | | 7/2005 |
| JP | 2005-204207 A | | 7/2005 |
| JP | 2005-210570 A | | 8/2005 |
| JP | 2006-148585 | | 6/2006 |
| JP | 2006148585 A | * | 6/2006 |
| JP | 2008-42325 A | | 2/2008 |

OTHER PUBLICATIONS

Office Action (Notice of Ground of Rejection) dated Dec. 21, 2010, issued in the corresponding Japanese Patent Application No. 2008-333716, and an English Translation thereof.

* cited by examiner

*Primary Examiner* — Dung Tran
(74) *Attorney, Agent, or Firm* — Buchanan Ingersoll & Rooney PC

(57) ABSTRACT

In order to reduce the data amount of image data while preventing degradation of image quality, an MFP includes an image data acquiring portion to acquire image data, a region extracting portion to extract regions having predetermined attributes from the image data, a selecting portion to select one of the extracted regions, a reduction portion to reduce the data amount of the image data by processing the selected region in a manner predetermined for the attribute of that region, and a comparing portion to compare the data amount of the image data after reduction of the data amount with a predetermined target value, in which the selecting portion selects the regions one by one until the comparing portion determines that the data amount of the image data is equal to or less than the target value.

25 Claims, 19 Drawing Sheets

F I G. 6
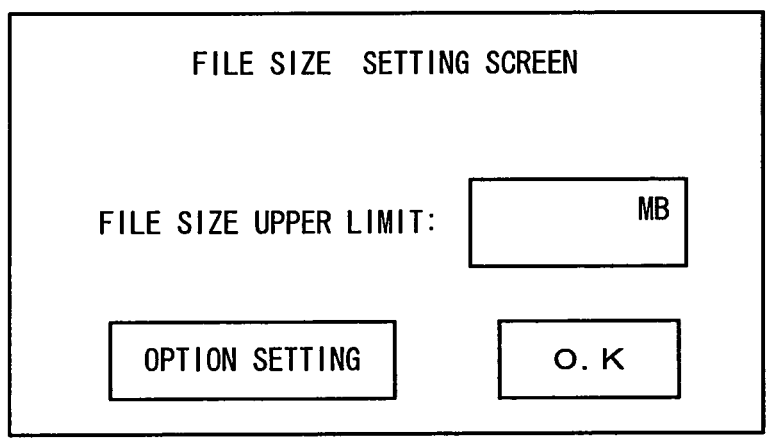

F I G. 1 1
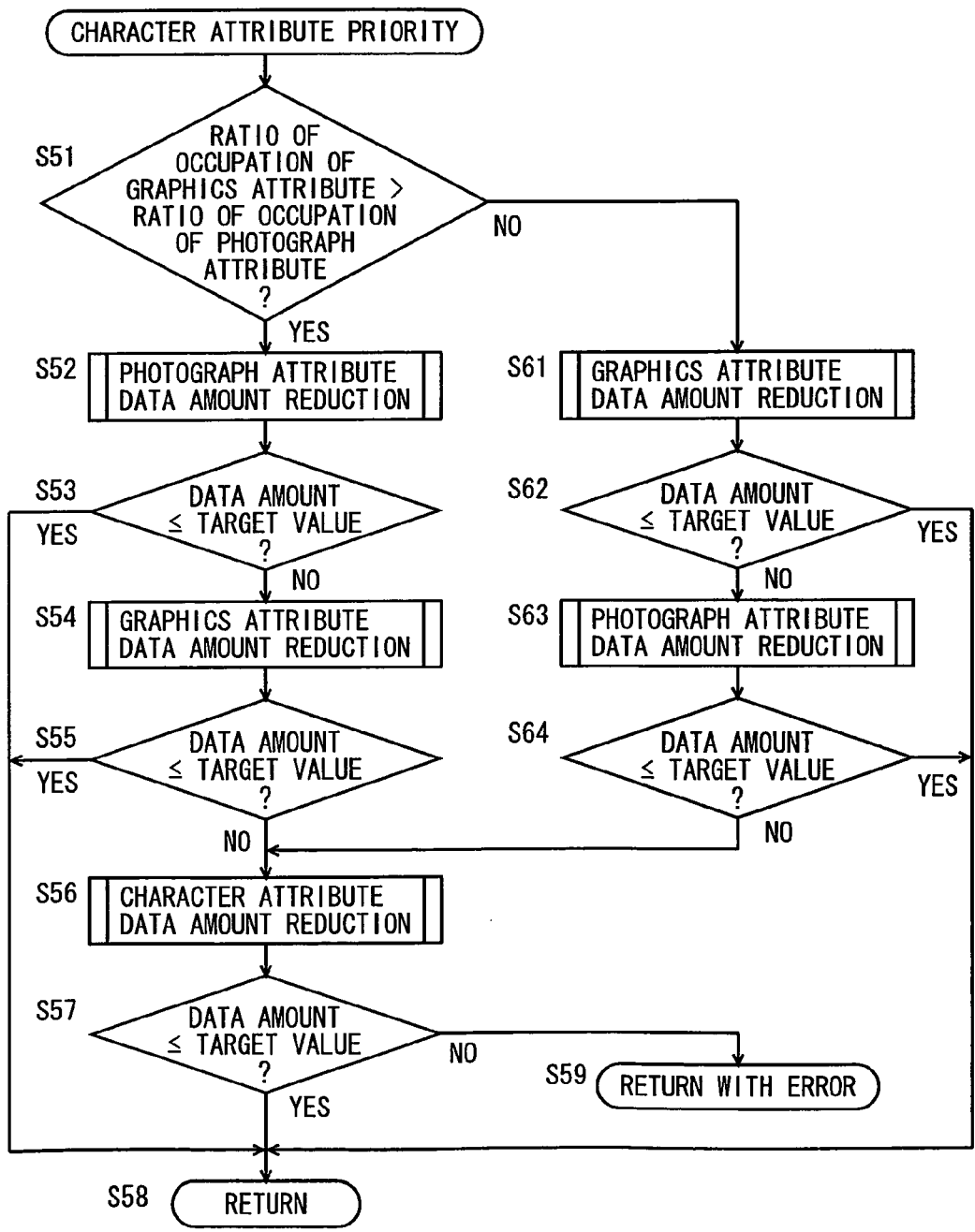

IMAGE PROCESSING APPARATUS, DATA AMOUNT REDUCING METHOD, AND DATA AMOUNT REDUCING PROGRAM EMBODIED ON COMPUTER READABLE MEDIUM

This application is based on Japanese Patent Application No. 2008-333716 filed with Japan Patent Office on Dec. 26, 2008, the entire content of which is hereby incorporated by reference.

BACKGROUND OF THE INVENTION

1. Field of the Invention

The present invention relates to an image processing apparatus, a data amount reducing method, and a data amount reducing program embodied on a computer readable medium. More particularly, the present invention relates to an image processing apparatus, a data amount reducing method, and a data amount reducing program embodied on a computer readable medium which reduce a data amount of image data to a desired amount.

2. Description of the Related Art

In recent years, image data which are read from originals by scanners or the like are transmitted via e-mail or the like. In data transmission via e-mail or the like, the data amount that can be transmitted at a time may be restricted in order to reduce the load on the network. In the case where the data amount of the image data is large, it is necessary to reduce the data amount of the image data so as not to exceed the limited amount. As a technique of reducing the data amount of image data, for example, Japanese Patent Laid-Open No. 2005-204206 discloses an image processing apparatus, in which the image data is separated into character images including characters and photograph images including graphic patterns or photographs other than the characters, and the character images are subjected to binarization and then modified modified READ (MMR) compression, while the photograph images are subjected to Joint Photographic Experts Group (JPEG) compression.

In the conventional image processing apparatus, however, all the character portions included in the image data are subjected to binarization, and all the photograph portions included in the image data are subjected to JPEG compression, which leads to degradation of image quality in both the character portions and the photograph portions. Binarization of the character portions may blur the characters to make them illegible. JPEG compression of the photograph portions will lead to degradation of image quality. Image data may include important portions that the user thinks to be important and unnecessary portions that the user does not think to be important. While it may not matter much when the unnecessary portions suffer degradation of image quality, it is desirable that good image quality is maintained for the important portions.

SUMMARY OF THE INVENTION

The present invention has been accomplished in view of the foregoing problems, and an object of the present invention is to provide an image processing apparatus capable of reducing the data amount of image data while preventing degradation of image quality.

Another object of the present invention is to provide a data amount reducing method which can reduce the data amount of image data while preventing degradation of image quality.

Yet another object of the present invention is to provide a data amount reducing program embodied on a computer readable medium which can reduce the data amount of image data while preventing degradation of image quality.

In order to achieve the above-described objects, according to an aspect of the present invention, an image processing apparatus includes: an image data acquiring portion to acquire image data; a region extracting portion to extract one or more regions having a predetermined attribute from the acquired image data; a selecting portion to select one region from among one or more regions extracted by the region extracting portion; a reduction portion to reduce a data amount of the image data by processing the selected region in a manner predetermined for the attribute of the region; and a comparing portion to compare the data amount of the image data after the data amount has been reduced by the reduction portion with a predetermined target value; the selecting portion selecting one region from among one or more regions sequentially until the comparing portion determines that the data amount of the image data is not more than the target value.

According to another aspect of the present invention, a data amount reducing method includes the steps of: acquiring image data; extracting one or more regions having a predetermined attribute from the acquired image data; selecting one region from among the extracted regions; reducing a data amount of the image data by processing the selected region in a manner predetermined for the attribute of the region; comparing the data amount of the image data after the data amount has been reduced in the reducing step with a predetermined target value; and repeating the selecting step and the reducing step until it is determined in the comparing step that the data amount of the image data after the data amount has been reduced is not more than the target value.

According to yet another aspect of the present invention, a data amount reducing program embodied on a computer readable medium causes a computer to perform the steps of: acquiring image data; extracting one or more regions having a predetermined attribute from the acquired image data; selecting one region from among the extracted regions; reducing a data amount of the image data by processing the selected region in a manner predetermined for the attribute of the region; comparing the data amount of the image data after the data amount has been reduced in the reducing step with a predetermined target value; and repeating the selecting step and the reducing step until it is determined in the comparing step that the data amount of the image data after the data amount has been reduced is not more than the target value.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of a file size setting screen.

FIG. 11 is a flowchart illustrating an example of the flow of a character attribute priority process.

DESCRIPTION OF THE PREFERRED EMBODIMENTS

Figure 1:
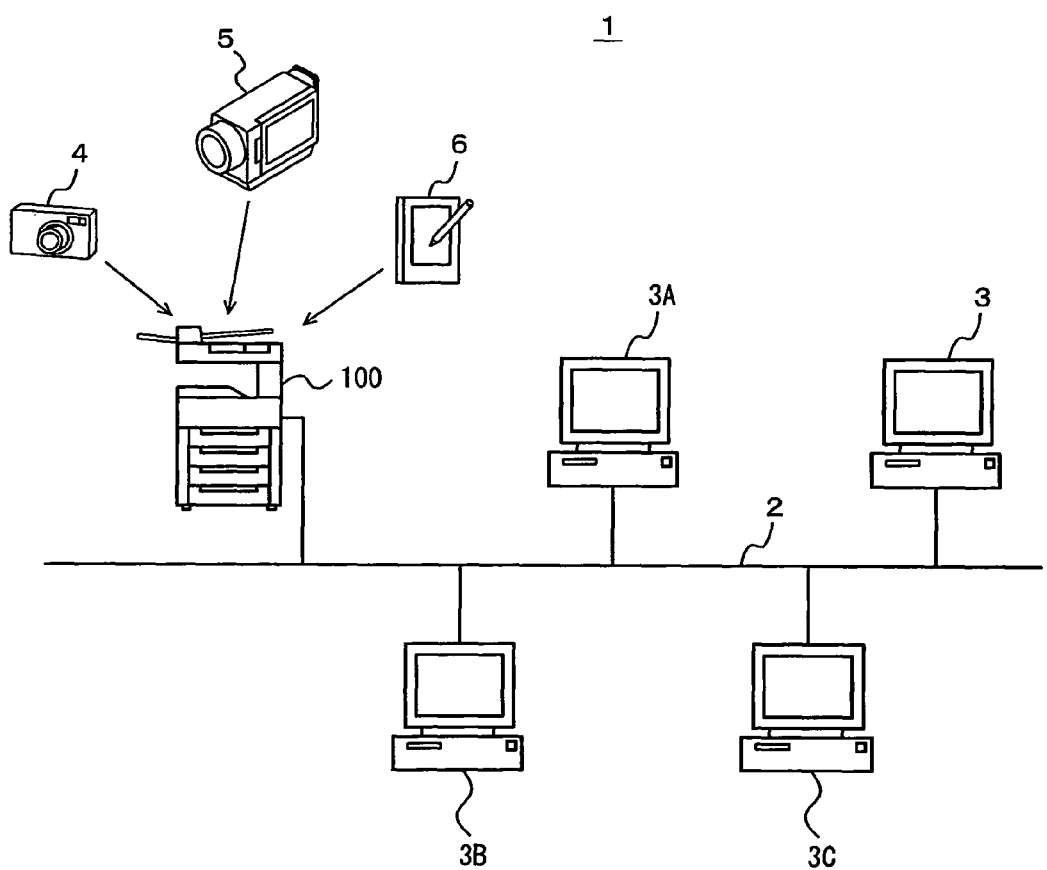
FIG. 1 is a schematic diagram of an image processing system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows an image processing system according to an embodiment of the present invention. Referring to FIG. 1, an image processing system 1 includes a multi function peripheral (MFP) 100 serving as an image processing apparatus and computers 3, 3A, 3B, and 3C, which are connected to a network 2. The system further includes a digital camera 4, a digital video camera 5, and a personal digital assistant 6, which are connected to MFP 100.

MFP 100 includes a scanner device for reading an original, and an image forming device and a facsimile device for forming an image on a recording medium such as a sheet of paper based on image data, and has the image reading function, copying function, and facsimile transmitting/receiving function.

Each of computers 3, 3A, 3B, and 3C is a typical personal computer, which is capable of transmitting to MFP 100 application data or image data which are generated as the computer executes an application program. Further, each of computers 3, 3A, 3B, and 3C has a printer driver program installed therein for controlling MFP 100, and converts the application data or the image data into print data for output to MFP 100. Furthermore, each of computers 3, 3A, 3B, and 3C can also serve as an image processing apparatus.

Digital camera 4 and digital video camera 5 each pick up and store still or moving images, and output image data for the still or moving images to MFP 100 to which they are connected. Personal digital assistant 6, likewise computers 3, 3A, 3B, and 3C, outputs application data or image data to MFP 100.

MFP 100 performs image processing on the image data obtained by reading an original, or on the image data received from any of computers 3, 3A, 3B, 3C, digital camera 4, digital video camera 5, and personal digital assistant 6. Further, MFP 100 can convert the application data or the print data received from any of computers 3, 3A, 3B, 3C, and personal digital assistant 6 into bitmap image data, and perform image processing on the resultant image data. In the case where the image data received from personal digital assistant 6 is for moving images, MFP 100 may perform image processing on a frame of the image.

MFP 100 is capable of transmitting the processed image data to any of computers 3, 3A, 3B, 3C, digital camera 4, digital video camera 5, and personal digital assistant 6, on the basis of a communication protocol for e-mail or file transfer.

Network 2 is a local area network (LAN), which may be connected in a wired or wireless manner. Network 2 is not necessarily the LAN; it may be a wide area network (WAN), the Internet, or the like.

Figure 2:
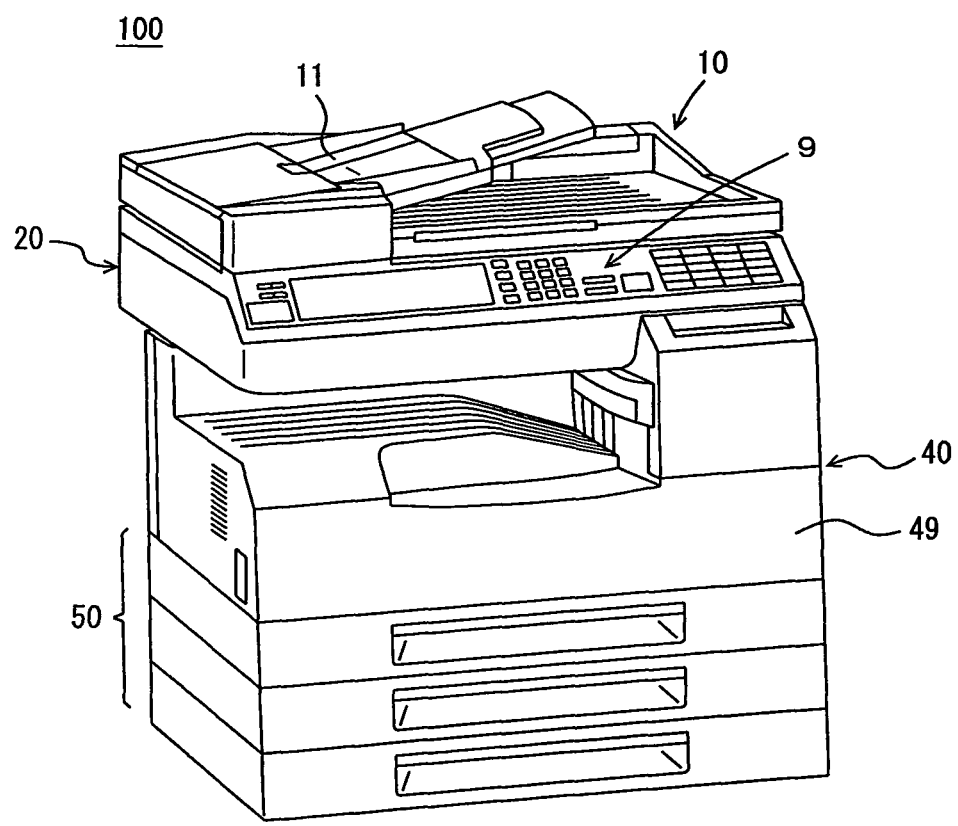
FIG. 2 is a perspective view of an MFP.

FIG. 2 is a perspective view of the MFP. Referring to FIG. 2, MFP 100 includes: an automatic document feeder (ADF) 10; an image reading portion 20; an image forming portion 40; and a paper feeding portion 50. ADF 10 delivers a plurality of originals mounted on a platform one by one to image reading portion 20. Image reading portion 20 reads image information of photograph, character, picture and the like from the original in an optical manner, to acquire image data. Image forming portion 40, in receipt of the image data, forms an image on a sheet of paper based on the image data. Image forming portion 40 forms an image using toners of four colors of cyan, magenta, yellow, and black. Paper feeding portion 50 stores sheets of paper, and supplies them one by one to image forming portion 40. MFP 100 includes an operation panel 9 on its upper surface.

Figure 3:
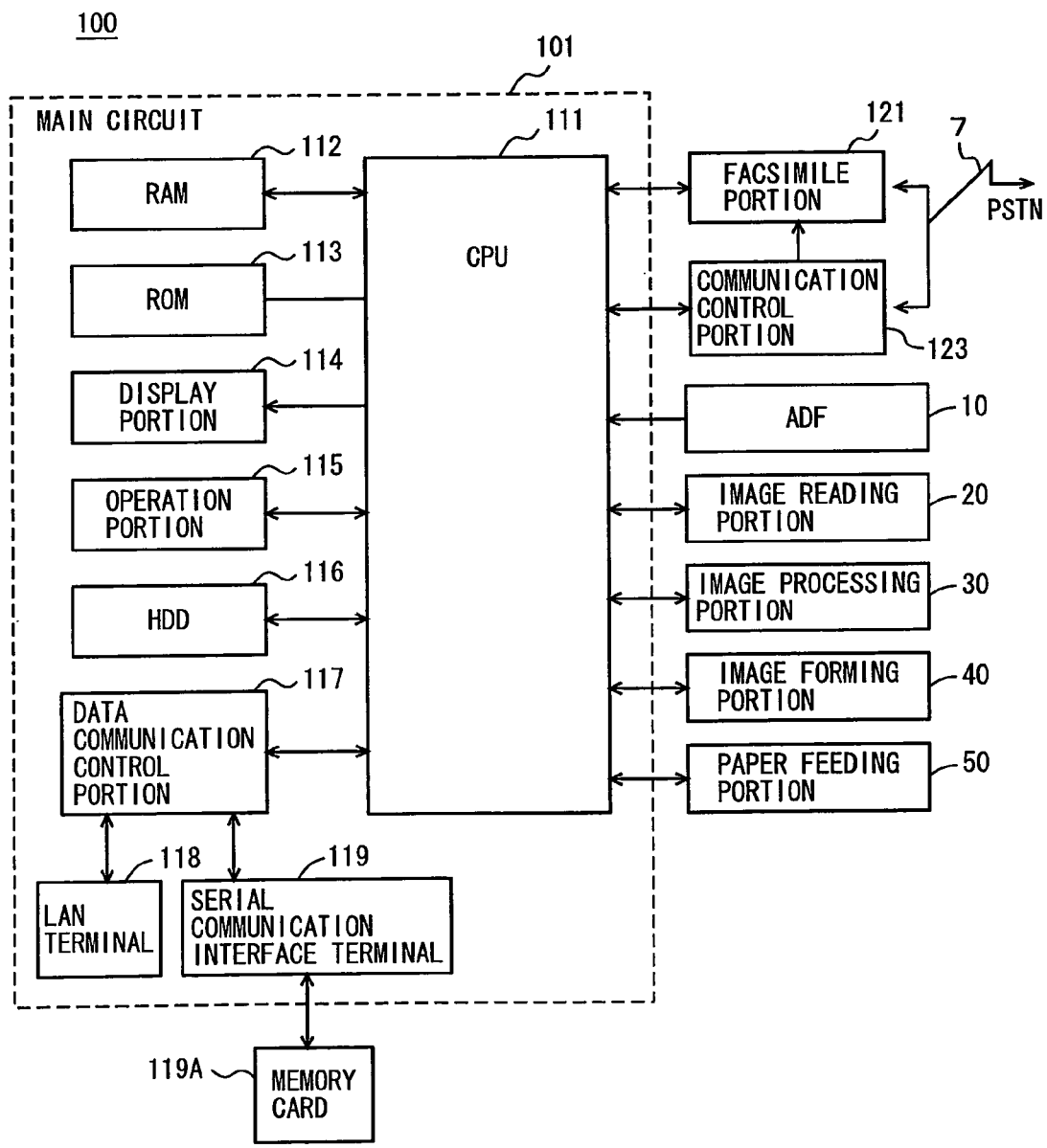
FIG. 3 is a block diagram showing an example of the hardware configuration of the MFP.

FIG. 3 is a block diagram showing an example of the hardware configuration of the MFP. Referring to FIG. 3, MFP 100 includes a main circuit 101, a facsimile portion 121, a communication control portion 123, ADF 10, image reading portion 20, an image processing portion 30, image forming portion 40, and paper feeding portion 50. Main circuit 101 includes: a central processing unit (CPU) 111; a random access memory (RAM) 112 used as a work area for CPU 111; a read only memory (ROM) 113 for storing, among others, a program executed by CPU 111; a display portion 114; an operation portion 115; a hard disk drive (HDD) 116 as a mass storage; and a data communication control portion 117. CPU 111 is connected to display portion 114, operation portion 115, HDD 116, and data communication control portion 117, and is responsible for overall control of main circuit 101. Further, CPU 111 is connected to facsimile portion 121, communication control portion 123, ADF 10, image reading portion 20, image processing portion 30, image forming portion 40, and paper feeding portion 50, and is responsible for overall control of MFP 100.

Display portion 114 is a display such as a liquid crystal display (LCD), an organic electro-luminescence display (ELD), or the like, and displays an instruction menu for the user, information about acquired image data, and others. Operation portion 115 is provided with a plurality of keys, and accepts input of data such as instructions, characters, and numerical characters, in accordance with the key operations of the user. Operation portion 115 includes a touch panel provided on display portion 114. Display portion 114 and operation portion 115 constitute operation panel 9.

Data communication control portion 117 includes a LAN terminal 118 that is an interface for communication according to a communication protocol such as transmission control protocol (TCP) or user datagram protocol (UDP), and a serial communication interface terminal 119. Data communication control portion 117 transmits and receives data to and from an external apparatus connected to LAN terminal 118 or serial communication interface terminal 119, in accordance with an instruction from CPU 111.

In the case where a LAN cable which is connected with network 2 is connected to LAN terminal 118, data communication control portion 117 communicates with another MFP, scanner, printer, or any of computers 3, 3A, 3B, and 3C, connected via LAN terminal 118. Data communication control portion 117 may also communicate with an e-mail server connected via LAN terminal 118 for transmission/reception of e-mail.

In the case where an apparatus is connected to serial communication interface terminal 119, data communication control portion 117 communicates with the apparatus connected to serial communication interface terminal 119, which may be digital camera 4, digital video camera 5, or personal digital assistant 6, for input/output of image data. A memory card 119A having a flash memory built therein may be connected to serial communication interface terminal 119. In this case, CPU 111 controls data communication control portion 117 to input and output image data to and from memory card 119A.

Further, CPU 111 controls data communication control portion 117 to read from memory card 119A a data amount reducing program to be executed by CPU 111 or image processing portion 30, and stores the read data amount reducing program in RAM 112 for execution. It is noted that the recording medium for storing the program to be executed by CPU 111 or image processing portion 30 is not restricted to memory card 119A. It may be a flexible disk, a cassette tape, an optical disc (compact disc-ROM (CD-ROM), magneto-optical (MO) disc, mini disc (MD), digital versatile disc (DVD)), an IC card (including a memory card), an optical card, or a semiconductor memory such as a mask ROM, an erasable and programmable ROM (EPROM), an electrically EPROM (EEPROM), or the like.

Still further, CPU 111 may download the data amount reducing program from a computer connected to the Internet and store the same in HDD 116, or a computer connected to the Internet may write the data amount reducing program to HDD 116, and thereafter, the data amount reducing program stored in HDD 116 may be loaded to RAM 112 for execution by CPU 111 or image processing portion 30. As used herein, the "data amount reducing program" includes, not only the one that can be executed directly by CPU 111 or image processing portion 30, but also a source program, a compressed program, an encrypted program, and others.

Communication control portion 123 is a modem for connecting CPU 111 to public switched telephone networks (PSTN) 7. MFP 100 is assigned a telephone number in PSTN 7 in advance. When there is a call from a facsimile machine connected to PSTN 7 to the telephone number assigned to MFP 100, communication control portion 123 detects the call. Upon detection of the call, communication control portion 123 establishes the call to enable communication of facsimile portion 121.

Facsimile portion 121 is connected to PSTN 7, and transmits facsimile data to or receives facsimile data from PSTN 7. Facsimile portion 121 temporarily stores the received facsimile data in RAM 112. Further, facsimile portion 121 converts the received facsimile data into print data which can be printed by image forming portion 40, and outputs the print data to image forming portion 40. This allows the facsimile data received by facsimile portion 121 to be printed on a recording sheet by image forming portion 40. Furthermore, facsimile portion 121 converts the image data stored in HDD 116 into facsimile data, and outputs the facsimile data to a facsimile machine or another MFP connected to PSTN 7. In this manner, the data stored in HDD 116 can be output to a facsimile machine or another MFP. It is noted that the facsimile data is included in the image data. As such, MFP 100 has the facsimile transmitting/receiving function.

MFP 100 has a scanner function, and temporarily stores in RAM 112 the image data which has been read from an original by and is output from image reading portion 20. Further, image forming portion 40 forms an image on a recording sheet such as a sheet of paper, on the basis of the image data read from the original by and output from image reading portion 20. As such, MFP 100 has the copying function. Furthermore, data communication control portion 117 temporarily stores in RAM 112 the image data which has been received from any of PCs 3, 3A, 3B, and 3C connected to network 2, or the image data which has been received from any of digital camera 4, digital video camera 5, and personal digital assistant 6 connected to serial communication interface terminal 119. An image is then formed on a recording sheet such as a sheet of paper, on the basis of the image data temporarily stored in RAM 112. As such, MFP 100 has the printing function.

Image processing portion 30 performs image processing on the image data stored in RAM 112. Here, it is assumed that image processing portion 30 executes a process of converting the file format of the image data. In this case, the image data to be subjected to the image processing may include: the image data that has been read from an original by and is output from image reading portion 20 in the case where MFP 100 enables the scanner or copying function; the facsimile data (image data) that is received by facsimile portion 121 in the case where MFP 100 enables the facsimile function; the image data that is received by data communication control portion 117 from any of PCs 3, 3A, 3B, 3C, a scanner, and another MFP connected to network 2; or the image data that is input from any of digital camera 4, digital video camera 5, and personal digital assistant 6 connected to serial communication interface terminal 119. Furthermore, the image data to be subjected to the image processing may include: the image data obtained by converting the format of the application data or print data received from any of PCs 3, 3A, 3B, 3C, and personal digital assistant 6 into a bitmap format; or the frame of image data included in the moving images received from digital camera 4 or digital video camera 5.

Figure 4:
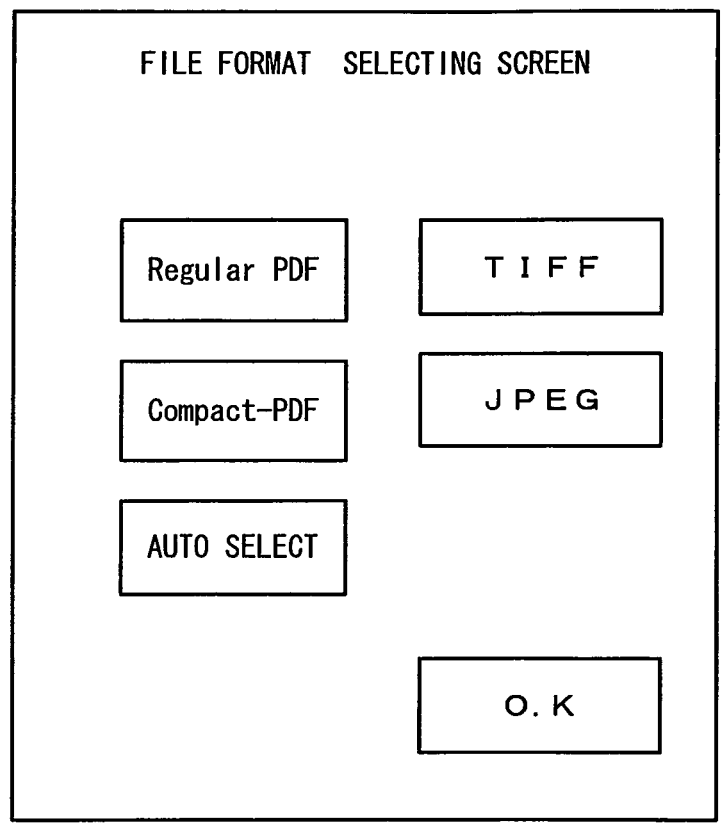
FIG. 4 shows an example of a file format selecting screen.

For executing the process of converting the file format, image processing portion 30 displays a file format selecting screen on display portion 114, to accept a setting of a file format into which the file format of the image data to be subjected to the image processing is to be converted. FIG. 4 shows an example of the file format selecting screen. Referring to FIG. 4, the file format selecting screen includes, as buttons for selecting one of four types of file formats, a button labeled "Regular PDF" for selecting PDF as the file format; a button labeled "TIFF" for selecting TIFF as the file format; a button labeled "Compact PDF" for selecting Compact PDF as the file format; and a button labeled "JPEG" for selecting JPEG as the file format. When any of the four buttons has been designated and a button labeled "OK" is designated, then image processing portion 30 converts the file format of the image data to be processed, into the file format determined in correspondence with the designated button.

The file format selecting screen further includes a button labeled "Auto Select" for selecting bitmap as the file format. When the "Auto Select" button and the "OK" button are designated in succession, image processing portion 30 executes a data amount reduction process, so as to convert the file format of the image data into the bitmap file format having the reduced data amount. In the following, the case where image processing portion 30 performs the data amount reduction process will be described.

Figure 5:
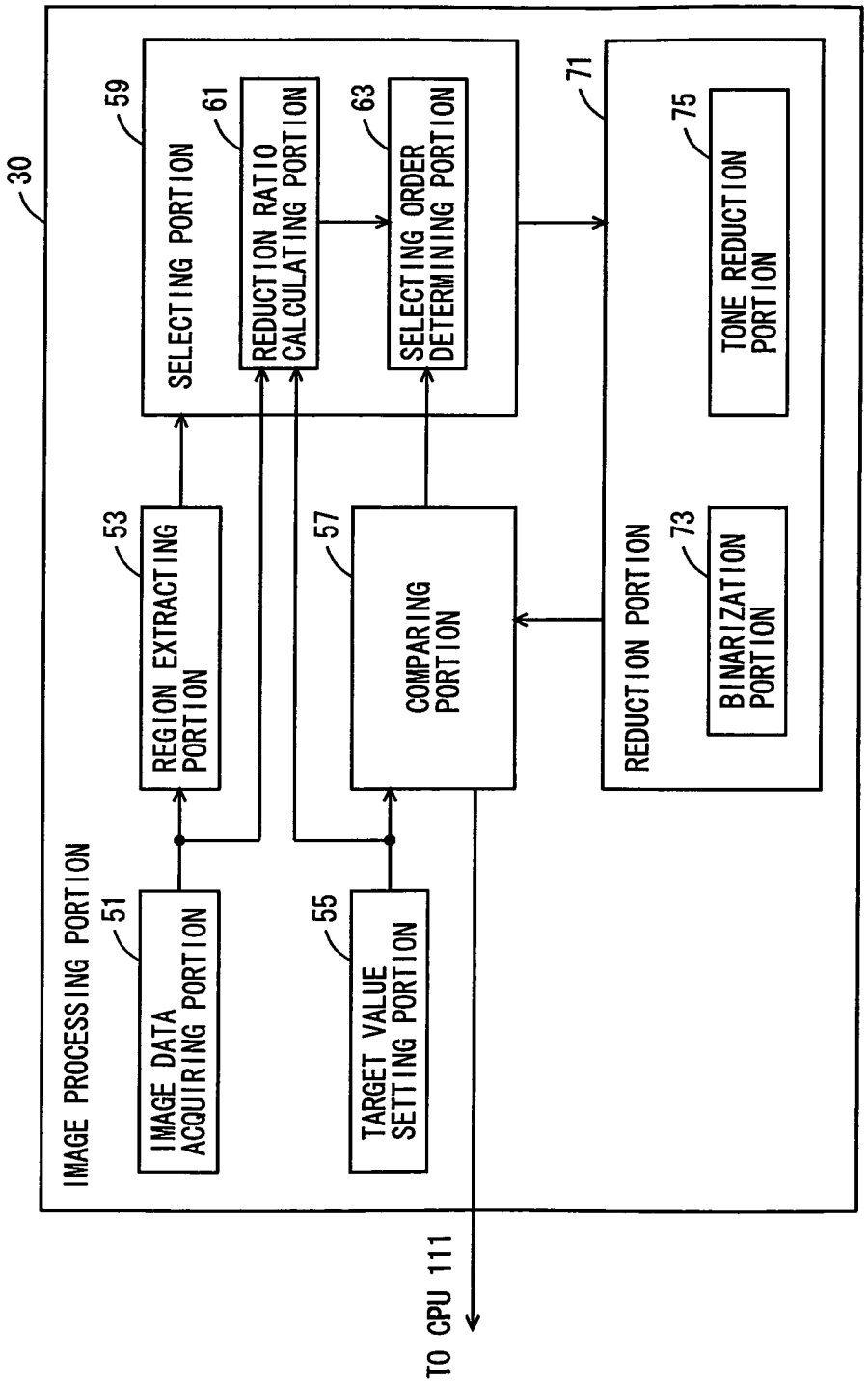
FIG. 5 is a functional block diagram showing by way of example the functions of an image processing portion.

FIG. 5 is a functional block diagram showing by way of example the functions of the image processing portion. Referring to FIG. 5, image processing portion 30 includes: an image data acquiring portion 51 which acquires image data; a region extracting portion 53 which extracts at least one region having a predetermined attribute from the image data; a selecting portion 59 which selects a region to be processed from among the extracted regions; a reduction portion 71 which reduces the data amount of the selected region; a target value setting portion 55 for setting a target value; and a comparing portion 57 which compares the data amount of the image data with the target value.

Image data acquiring portion 51 acquires image data in accordance with an instruction input into operation portion 115 by a user. Specifically, in the case where the user inputs to MFP 100 an operation to enable the scanner or copying function, image data acquiring portion 51 acquires the image data that has been read from an original by and is output from image reading portion 20. In the case where the user inputs to MFP 100 an operation to enable the facsimile function, image data acquiring portion 51 acquires the facsimile data (image data) that is received by facsimile portion 121. Further, in the case where the user inputs an operation to cause data communication control portion 117 to receive image data from any of PCs 3, 3A, 3B, 3C, a scanner, and another MFP connected to network 2, then image data acquiring portion 51 acquires the image data received by data communication control portion 117. Still further, in the case where the user inputs an operation to read image data from any of digital camera 4, digital video camera 5, and personal digital assistant 6 connected to serial communication interface terminal 119, image data acquiring portion 51 acquires the image data stored in the apparatus connected to serial communication interface terminal 119. Image data acquiring portion 51 outputs the acquired image data to region extracting portion 53 and selecting portion 59.

Region extracting portion 53 extracts, from the image data input from image data acquiring portion 51, a character region which has a character attribute and includes one or more characters, a graphics region which has a graphics attribute and includes one or more graphic patterns, and a photograph region which has a photograph attribute and includes one or more photographs. The technique of extracting the regions having the character, graphics, and photograph attributes from image data is well known in the art, and thus, description thereof will not be provided here. Region extracting portion 53 outputs the extracted character, graphics, or photograph region to selecting portion 59. There may be a case where a plurality of character regions, a plurality of graphics regions, and/or a plurality of photograph regions are extracted from a piece of image data. When two or more character regions are extracted from the image data, region extracting portion 53 outputs the extracted character regions to selecting portion 59. When two or more graphics regions are extracted from the image data, region extracting portion 53 outputs the graphics regions to selecting portion 59. Furthermore, when two or more photograph regions are extracted from the image data, region extracting portion 53 outputs the photograph regions to selecting portion 59.

Target value setting portion 55 sets a target value for a data amount of the image data after reduction of the data amount. Specifically, in the state where the file format selecting screen as shown in FIG. 4 is being displayed on display portion 114, when the "Auto Select" button and the "OK" button are designated in succession, target value setting portion 55 displays a file size setting screen on display portion 114. Target value setting portion 55 accepts the file size that the user inputs into operation portion 115 in accordance with the file size setting screen, and sets the accepted file size as the target value. Target value setting portion 55 outputs the set target value to comparing portion 57 and selecting portion 59.

FIG. 6 shows an example of the file size setting screen. Referring to FIG. 6, the file size setting screen includes: a field for inputting an upper limit of the file size, a button labeled "OK", and a button labeled "Option Setting". When the user operates operation portion 115 to input an upper limit for the file size in the corresponding field and then designates the "OK" button, the input upper limit for the file size is accepted by target value setting portion 55. The case where the "Option Setting" button is designated will be described later.

Returning to FIG. 5, selecting portion 59 includes a reduction ratio calculating portion 61 and a selecting order determining portion 63. Reduction ratio calculating portion 61 receives the target value from target value setting portion 55 and the image data from image data acquiring portion 51. Reduction ratio calculating portion 61 calculates a ratio of the data amount to be reduced (data reduction amount) based on the data amount of the image data and the target value. For example, in the case where the target value is 3 Mbytes and the data amount of the image data is 5 Mbytes, the reduction ratio is calculated as follows: $(5-3)/5 \times 100 = 40(\%)$. Reduction ratio calculating portion 61 outputs the calculated reduction ratio to selecting order determining portion 63.

Selecting order determining portion 63 determines the order of selecting one region from among the plurality of regions received from region extracting portion 53, on the basis of the reduction ratio received from reduction ratio calculating portion 61. Specifically, in the case where the reduction ratio is smaller than a predetermined value, selecting order determining portion 63 determines so that the regions are selected in ascending order of area occupied thereby, while in the case where the reduction ratio is not smaller than the predetermined value, selecting order determining portion 63 determines so that the regions are selected in descending order of area occupied thereby. Here, the predetermined value is set to 20%. When the reduction ratio is small, the data amount that should be reduced in the image data is small. This means that the data amount may be reduced in a small area. Thus, the data amount is reduced from the regions selected in ascending order of area, from the one having the smallest area, so that the area suffering degradation of image quality is kept as small as possible. In contrast, when the reduction ratio is large, the data amount that should be reduced in the image data is large, in which case it is necessary to reduce the data amount in a large area. Thus, the data amount is reduced from the regions selected in descending order of area, from the one having the largest area, for improved process efficiency.

Selecting order determining portion 63 selects one of the plurality of regions input from region extracting portion 53, in accordance with the determined order of selection, and outputs the selected region to reduction portion 71. Specifically, if the reduction ratio is smaller than 20%, selecting order determining portion 63 selects the regions in ascending order of area occupied thereby, from the one having the smallest area, whereas if the reduction ratio is not smaller than 20%, selecting order determining portion 63 selects the regions in descending order of area occupied thereby, from the one having the largest area. Selecting order determining portion 63 then outputs the selected region to reduction portion 71. While the threshold value is set to 20% in this example, the threshold value is not limited thereto; it may be set to a larger or smaller value, in accordance with a system used for reducing the data amount. That is, a greater threshold value may be set if a large amount of data is to be reduced by the system used.

Reduction portion 71 processes the region received from selecting portion 59 in a manner predetermined in accordance with the attribute of that region, to thereby reduce the data amount of part of the image data. Reduction portion 71 includes a binarization portion 73 and a tone reduction portion 75. In the case where the region input from selecting portion 59 has a character attribute, binarization portion 73 performs binarization on the character region. In the case where the region input from selecting portion 59 has a graphics attribute or a photograph attribute, tone reduction portion 75 performs tone reduction on the graphics region or the photograph region. Specifically, for a plurality of pixels having similar colors, tone reduction portion 75 changes those colors into one color. Reduction portion 71 outputs the image data with the data amount reduced, to comparing portion 57. In this manner, reduction portion 71 reduces the data amount of the image data by performing binarization or tone reduction on part of the image data.

Comparing portion 57 receives the target value from target value setting portion 55 and the image data with the reduced data amount from reduction portion 71. Comparing portion 57 compares the data amount of the image data after the data amount has been reduced, with the target value. If the data amount of the image data is equal to or less than the target value, comparing portion 57 outputs the image data with the reduced data amount to CPU 111. On the other hand, if the data amount of the image data is more than the target value, comparing portion 57 outputs the image data with the reduced data amount to selecting portion 59.

Selecting portion 59 then selects a region to be processed next, in accordance with the order of selection previously set by selecting order determining portion 63, and outputs the selected region to reduction portion 71. In this manner, from among the regions extracted from the image data, selecting portion 59 sequentially selects one region at a time and reduction portion 71 reduces the data amount of the selected region, until when comparing portion 57 determines that the data amount of the image data after the data amount has been reduced by reduction portion 71 is equal to or less than the target value. Accordingly, binarization or tone reduction of part of the image data is repeated so as to gradually increase the area to be subjected to binarization or tone reduction, until the data amount of the image data acquired by image data acquiring portion 51 is reduced to the amount that is as close as possible to the target value. This may keep the portion suffering degradation of image quality as small as possible.

Figure 7:
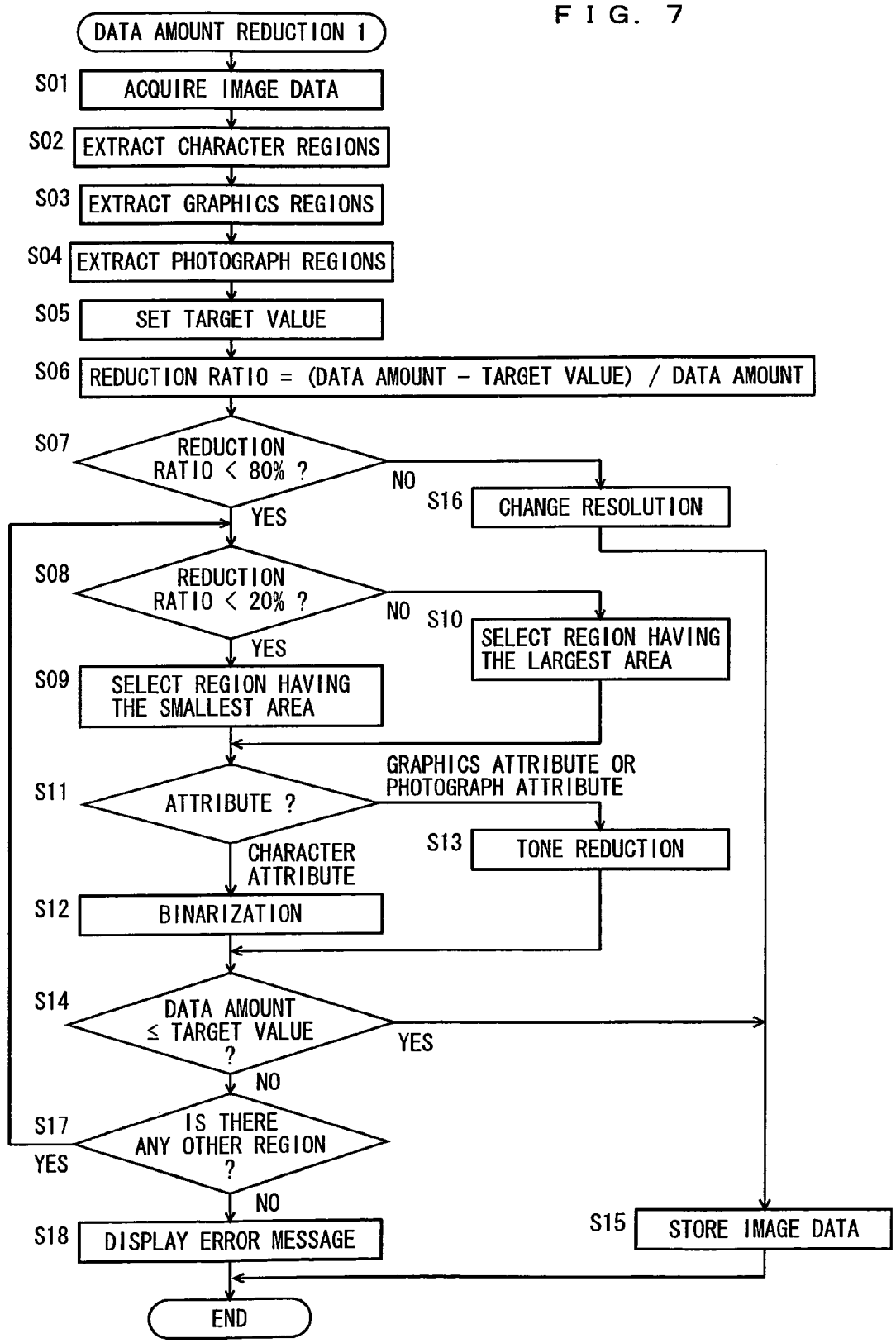
FIG. 7 is a flowchart illustrating an example of the flow of a data amount reduction process.

FIG. 7 is a flowchart illustrating an example of the flow of a data amount reduction process. The data amount reduction process is carried out by image processing portion 30 as image processing portion 30 executes a data amount reducing program. Referring to FIG. 7, image processing portion 30 acquires image data (step S01). In the case where the user inputs to MFP 100 an operation to enable the scanner or copying function, image processing portion 30 acquires the image data that has been read from an original by and is output from image reading portion 20. In the case where the user inputs to MFP 100 an operation to enable the facsimile function, image processing portion 30 acquires the facsimile data (image data) that is received by facsimile portion 121. Further, in the case where the user inputs an operation to cause data communication control portion 117 to receive image data from any of PCs 3, 3A, 3B, 3C, a scanner, and another MFP connected to network 2, then image processing portion 30 acquires the image data that is received by data communication control portion 117. Still further, in the case where the user inputs an operation to read image data from any of digital camera 4, digital video camera 5, and personal digital assistant 6 connected to serial communication interface terminal 119, image processing portion 30 acquires the image data stored in the apparatus connected to serial communication interface terminal 119.

Next, character regions having a character attribute, if any, are extracted from the image data acquired in step S01 (step S02), graphics regions having a graphics attribute, if any, are extracted from the image data acquired in step S01 (step S03), and photograph regions having a photograph attribute, if any, are extracted from the image data acquired in step S01 (step S04).

In the following step S05, a target value is set. Specifically, the file size setting screen is displayed on display portion 114 to accept an upper limit for the file size that is input into operation portion 115 by the user, and the accepted upper limit value is set as the target value. Then, in step S06, a reduction ratio is calculated. Specifically, the target value that has been set is subtracted from the data amount of the image data acquired in step S01, and the resultant value is divided by the data amount of the image data acquired in step S01, to thereby obtain the reduction ratio.

In the following step S07, it is determined whether the reduction ratio that has been calculated is smaller than 80%. If the reduction ratio is smaller than 80%, the process proceeds to step S08; otherwise, the process proceeds to step S16. In step S16, resolution of the image data acquired in step S01 is changed, and the process proceeds to step S15. In step S15, the image data whose resolution has been changed is stored in HDD 116, and the process is terminated. The resolution of the image data is changed in accordance with the target value set in step S05. That is, the resolution is determined such that the data amount of the image data after the resolution is changed becomes equal to or less than the target value. Alternatively, the resolution may be lowered only by a predetermined value, and the process may return to step S06 to re-calculate the reduction ratio on the basis of the data amount of the image data whose resolution has been changed. Then, the data amount may be reduced using another technique.

In step S08, it is determined whether the calculated reduction ratio is smaller than 20%. If the reduction ratio is smaller than 20%, the process proceeds to step S09; otherwise, the process proceeds to step S10.

In step S09, as a region to be processed, the region having the smallest area is selected from among the one or more character regions extracted in step S02, the one or more graphics regions extracted in step S03, and the one or more photograph regions extracted in step S04. The process then proceeds to step S11. In step S10, as the region to be processed, the region having the largest area is selected from among the one or more character regions extracted in step S02, the one or more graphics regions extracted in step S03, and the one or more photograph regions extracted in step S04. The process then proceeds to step S11.

In step S11, the attribute of the region selected as the process target is determined, and the process branches in accordance with the attribute. Specifically, if the attribute of the region selected as the process target is the character attribute, the process proceeds to step S12, and if the attribute of the region is the graphics attribute or the photograph attribute, the process proceeds to step S13. In step S12, part of the image data corresponding to the character region selected as the process target is subjected to binarization, and the process proceeds to step S14. In step S13, part of the image data corresponding to the graphics region or the photograph region selected as the process target is subjected to tone reduction, and the process proceeds to step S14.

In step S14, it is determined whether the data amount of the image data which has been partially subjected to binarization and/or tone reduction in step S12 and/or step S13 is equal to or less than the target value set in step S05. If the data amount is equal to or less than the target value, the process proceeds to step S15; otherwise, the process proceeds to step S17.

In step S17, it is determined whether there is another region yet to be processed. If there is another region yet to be processed, the process returns to step S08; otherwise, the process proceeds to step S18. In step S18, an error message is displayed on display portion 114, and the process is terminated. The error message is a message notifying the user that the data amount of the image data could not be reduced to the amount that had been set by the user. For example, the message may read: "Failed to reduce the data amount of the image data to the set amount."

If there is another region yet to be processed, the process returns to step S08, and binarization or tone reduction of part of the image data acquired in step S01 is repeated until the data amount after the binarization or tone reduction becomes the target value or less. As described above, unlike the conventional case where the entirety of image data is subjected to binarization and tone reduction, binarization or tone reduction is performed only on part of the image data, which may keep the portion suffering degradation of image quality as small as possible. Furthermore, repetition of binarization or tone reduction of part of the image data is stopped once the data amount of the image data becomes the target value or less, so that it is possible to make the data amount of the image data approach as close as possible to the target value. This prevents the data amount of the image data from becoming unnecessarily smaller than the target value, and can minimize the portion suffering degradation of image quality.

<Modification>

In MFP 100 of the embodiment described above, the order of selecting a region to be processed from among a plurality of regions included in the image data is set to either an ascending order or a descending order of area occupied by the respective regions. In MFP 100 according to a modification, when a region to be processed is selected from among a plurality of regions included in the image data, an attribute is selected at first, and then the region to be processed is selected one by one from among the regions having the selected attribute.

Figure 8:
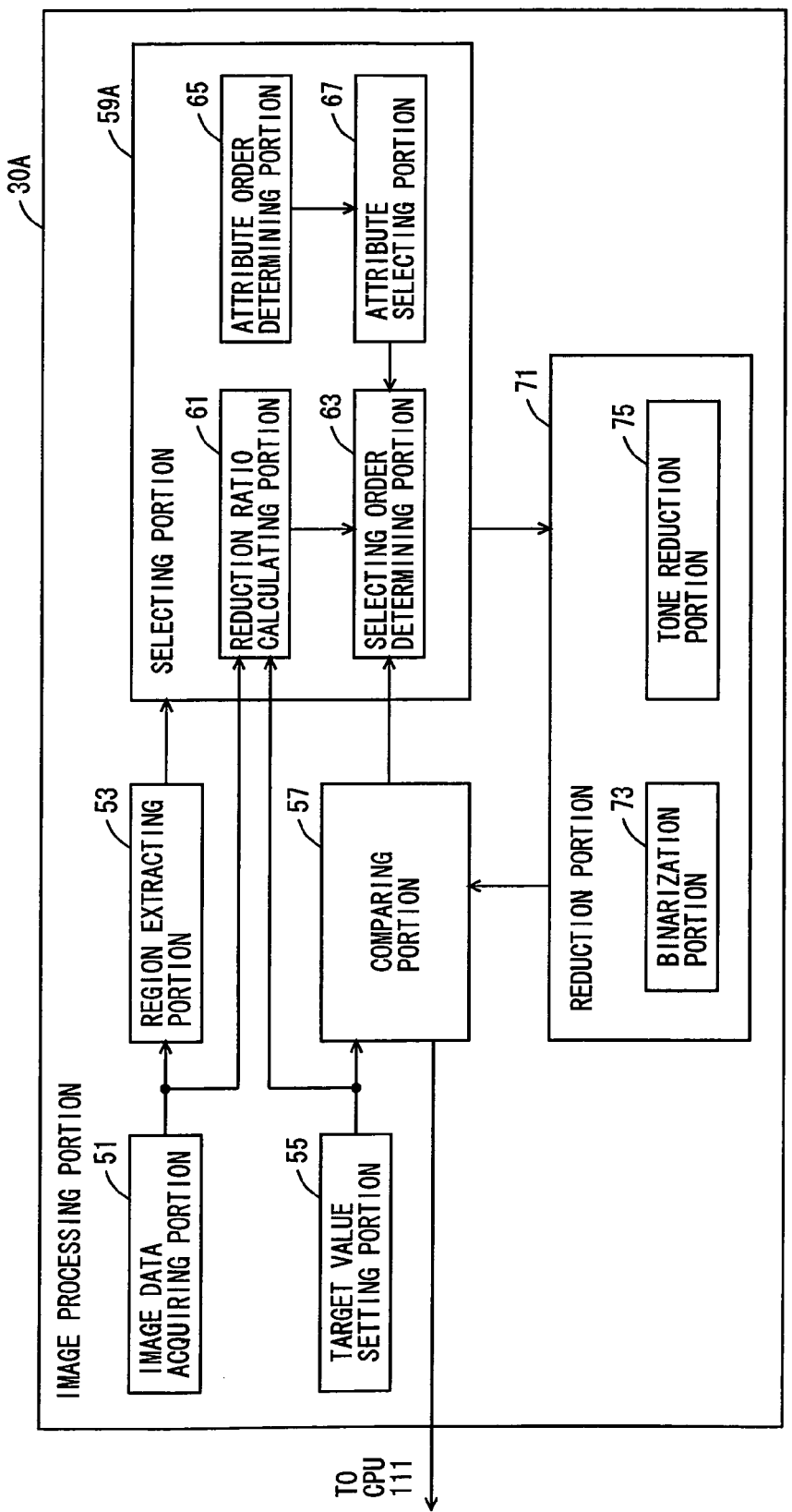
FIG. 8 is a functional block diagram schematically showing the functions of an image processing portion included in an MFP according to a modification.

FIG. 8 is a functional block diagram schematically showing the functions of the image processing portion included in the MFP according to the modification. The functional block diagram in FIG. 8 differs from that in FIG. 5 in that selecting portion 59 has been modified to a selecting portion 59A. Selecting portion 59A includes, in addition to reduction ratio calculating portion 61 and selecting order determining portion 63, an attribute order determining portion 65 and an attribute selecting portion 67.

Attribute order determining portion 65 displays an option setting screen on display portion 114, to accept an attribute selecting condition for selecting an attribute which is input into operation portion 115 by a user in accordance with the option setting screen. The option setting screen is displayed on display portion 114 when the user designates the "Option Setting" button in the file size setting screen shown in FIG. 6.

Figure 9:
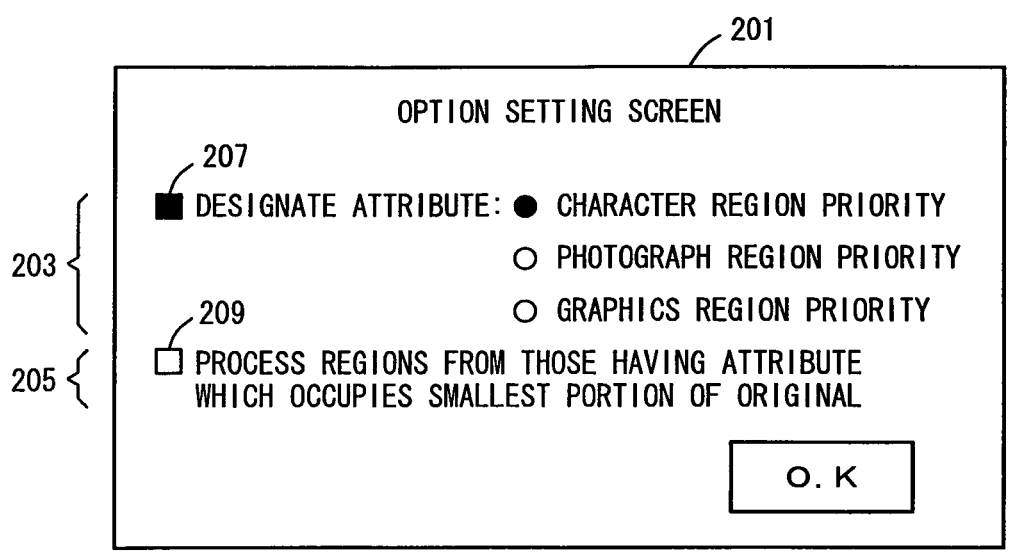
FIG. 9 shows an example of an option setting screen.

FIG. 9 shows an example of the option setting screen. Referring to FIG. 9, the option setting screen 201 includes a field 203 for the user to select an attribute to which the user wishes to give priority in terms of image quality, and a field 205 for the user to select a setting in which the order of selecting an attribute to be processed is determined automatically in accordance with the image data. Field 203 or field 205 may be designated exclusively.

When a check box 207 is designated, an attribute to which the user gives priority in terms of image quality becomes selectable. When a combo box for the option labeled "character region priority" is designated, setting of giving priority to the character regions having the character attribute is input. When a combo box for the option labeled "photograph region priority" is designated, setting of giving priority to the photograph regions having the photograph attribute is input. When a combo box for the option labeled "graphics region priority" is designated, setting of giving priority to the graphics regions having the graphics attribute is input. Two of the three options may be designated simultaneously.

When a check box 209 is designated, a setting in which the order of selecting the attribute to be processed is determined automatically in accordance with the image data is input.

Returning to FIG. 8, when the setting of giving priority to the character regions having the character attribute is input, attribute order determining portion 65 selects the photograph regions or the graphics regions in preference to the character regions having the character attribute. When the setting of giving priority to the photograph regions having the photograph attribute is input, attribute order determining portion 65 selects the character regions or the graphics regions in preference to the photograph regions. When the setting of giving priority to the graphics regions having the graphics attribute is input, attribute order determining portion 65 selects the character regions or the photograph regions in preference to the graphics regions. In this manner, the regions having the attribute to which the user has given priority are selected lastly. This ensures that the regions of the attribute that has been given priority by the user will suffer degradation of image quality as little as possible. It is noted that the order of selecting the attribute to be processed from the two attributes other than the one given priority by the user is determined by a method of automatically determining the order of selection in accordance with the image data, which will be described in the following.

Hereinafter, the method of automatically determining the order of selecting the attribute to be processed will be described. When check box 209 is designated in option setting screen 201, attribute order determining portion 65 receives the setting in which the order of selecting the attribute to be processed is determined automatically in accordance with the image data. When receiving this setting in which the order of selecting the attribute to be processed is determined automatically, attribute order determining portion 65 determines the order of selecting an attribute from among the three attributes, on the basis of ratios ("ratios of occupation") occupied by the regions having the respective attributes in the image data. More specifically, the areas of all the character regions are summed up to obtain a sum total area, and the ratio of the sum total area to the entire area of the image data is calculated as the ratio of occupation of the character attribute. Similarly, the areas of all the photograph regions are summed up to obtain a sum total area, and the ratio of the sum total area to the entire area of the image data is calculated as the ratio of occupation of the photograph attribute. Furthermore, the areas of all the graphics regions are summed up to obtain a sum total area, and the ratio of the sum total area to the entire area of the image data is calculated as the ratio of occupation of the graphics attribute. Then, it is determined such that the attributes are selected in ascending order in terms of ratio of occupation calculated for each of the character attribute, photograph attribute, and graphics attribute. Attribute order determining portion 65 outputs the determined order of selecting the attributes to attribute selecting portion 67. The attribute having a smaller ratio of occupation is selected earlier. Therefore, the regions are subjected to binarization or tone reduction sequentially from those having the attribute which occupies a smaller portion of the entire area of the image data.

The three attributes are selected sequentially in ascending order of ratio of occupation. Thus, the regions suffering degradation of image quality can be classified in accordance with their attributes. Specifically, if the data amount of the image data becomes equal to or less than the target value when binarization or tone reduction is performed on the regions having the attribute whose ratio of occupation is the smallest, it is unnecessary to perform binarization or tone reduction on the regions having the attribute whose ratio of occupation is the second smallest or the greatest. Accordingly, degradation of image quality of the regions with the attribute whose ratio of occupation is the second smallest or the greatest can be prevented as much as possible. If the data amount of the image data does not become equal to or less than the target value even after binarization or tone reduction is performed on the regions having the attribute whose ratio of occupation is the smallest, then binarization or tone reduction is performed on the regions with the attribute whose ratio of occupation is the second smallest. If the data amount of the image data becomes equal to or less than the target value when the regions of the attribute whose ratio of occupation is the second smallest are subjected to binarization or tone reduction, it is unnecessary to perform binarization or tone reduction on the regions with the attribute whose ratio of occupation is the greatest. Accordingly, degradation of image quality of the regions with the attribute whose ratio of occupation is the greatest can be prevented as much as possible.

Furthermore, when attribute order determining portion 65 receives the setting of giving priority to the character regions having the character attribute, the setting of giving priority to the photograph regions having the photograph attribute, or the setting of giving priority to the graphics regions having the graphics attribute, attribute order determining portion 65 determines the order of selecting an attribute from the remaining two attributes, on the basis of the ratios (ratios of occupation) occupied by the regions having the respective attributes in the image data. Specifically, in the case where the setting of giving priority to the character regions is input, attribute order determining portion 65 compares the ratio of occupation of the photograph attribute with the ratio of occupation of the graphics attribute, and determines so that the attribute whose ratio of occupation is smaller is selected firstly, the attribute whose ratio of occupation is greater is selected secondly, and the character attribute is selected thirdly.

Similarly, in the case where the setting of giving priority to the photograph regions is input, attribute order determining portion 65 compares the ratio of occupation of the character attribute with the ratio of occupation of the graphics attribute, and determines so that the attribute whose ratio of occupation is smaller is selected firstly, the attribute whose ratio of occupation is greater is selected secondly, and the photograph attribute is selected thirdly. Furthermore, in the case where the setting of giving priority to the graphics regions is input, attribute order determining portion 65 compares the ratio of occupation of the character attribute with the ratio of occupation of the photograph attribute, and determines so that the attribute whose ratio of occupation is smaller is selected firstly, the attribute whose ratio of occupation is greater is selected secondly, and the graphics attribute is selected thirdly.

Attribute order determining portion 65 outputs the determined order of selecting the attributes to attribute selecting portion 67. In the case where the user has set an attribute to be given priority, the regions with that attribute are selected lastly. In this manner, the user can make the setting so that the regions having the desired attribute will not suffer degradation of image quality. For example, in the case where the regions including characters are important in the image data, the user may input the setting of giving priority to the character regions having the character attribute, to cause the character regions to be binarized lastly. There may be a case where the data amount of the image data becomes equal to or less than the target value as a result of tone reduction of the photograph regions or the graphics regions. In this case, binarization of the character regions is unnecessary, and therefore, it is possible to reduce the data amount of the image data while preventing the character regions from suffering degradation of image quality.

Furthermore, of the two attributes other than the attribute to which the user has given priority, the attribute whose ratio of occupation is smaller is selected first. Thus, if the data amount of the image data becomes equal to or less than the target value as a result of binarization or tone reduction of the regions having the attribute whose ratio of occupation is smaller, it is unnecessary to perform binarization or tone reduction on the regions having the attribute whose ratio of occupation is greater. Accordingly, degradation of image quality in the regions having the attribute whose ratio of occupation is greater can be prevented as much as possible.

Attribute selecting portion 67 receives the order of attributes from attribute order determining portion 65, and selects the regions having a target attribute from among the plurality of regions received from region extracting portion 53. Attribute selecting portion 67 then outputs the regions of the selected attribute, to selecting order determining portion 63. For example, assume that the order of attributes indicates that the attribute to be selected first is the character attribute, the attribute to be selected next is the photograph attribute, and the attribute to be selected lastly is the graphics attribute. In this case, attribute selecting portion 67 selects the character regions having the character attribute firstly, and outputs all the character regions to selecting order determining portion 63. Next, attribute selecting portion 67 selects the photograph regions having the photograph attribute, and outputs all the photograph regions to selecting order determining portion 63. Lastly, attribute selecting portion 67 selects the graphics regions having the graphics attribute, and outputs all the graphics regions to selecting order determining portion 63.

Selecting order determining portion 63 determines the order of selecting a region from the plurality of regions input from attribute selecting portion 67 among the plurality of regions output from region extracting portion 53, on the basis of the reduction ratio input from reduction ratio calculating portion 61. Selecting order determining portion 63 then selects a region in the determined order, and outputs the selected region to reduction portion 71. Specifically, in the case where a plurality of character regions having the character attribute are input from attribute selecting portion 67, selecting order determining portion 63 selects one of the character regions in ascending order of area if the reduction ratio is less than 20%, or in descending order of area if the reduction ratio is 20% or more, and outputs the selected region to reduction portion 71. In the case where a plurality of photograph regions having the photograph attribute are input from attribute selecting portion 67, selecting order determining portion 63 selects one of the photograph regions in ascending order of area if the reduction ratio is less than 20%, or in descending order of area if the reduction ratio is 20% or more, and outputs the selected region to reduction portion 71. Furthermore, in the case where a plurality of graphics regions having the graphics attribute are input from attribute selecting portion 67, selecting order determining portion 63 selects one of the graphics regions in ascending order of area if the reduction ratio is less than 20%, or in descending order of area if the reduction ratio is 20% or more, and outputs the selected region to reduction portion 71.

Figure 10:
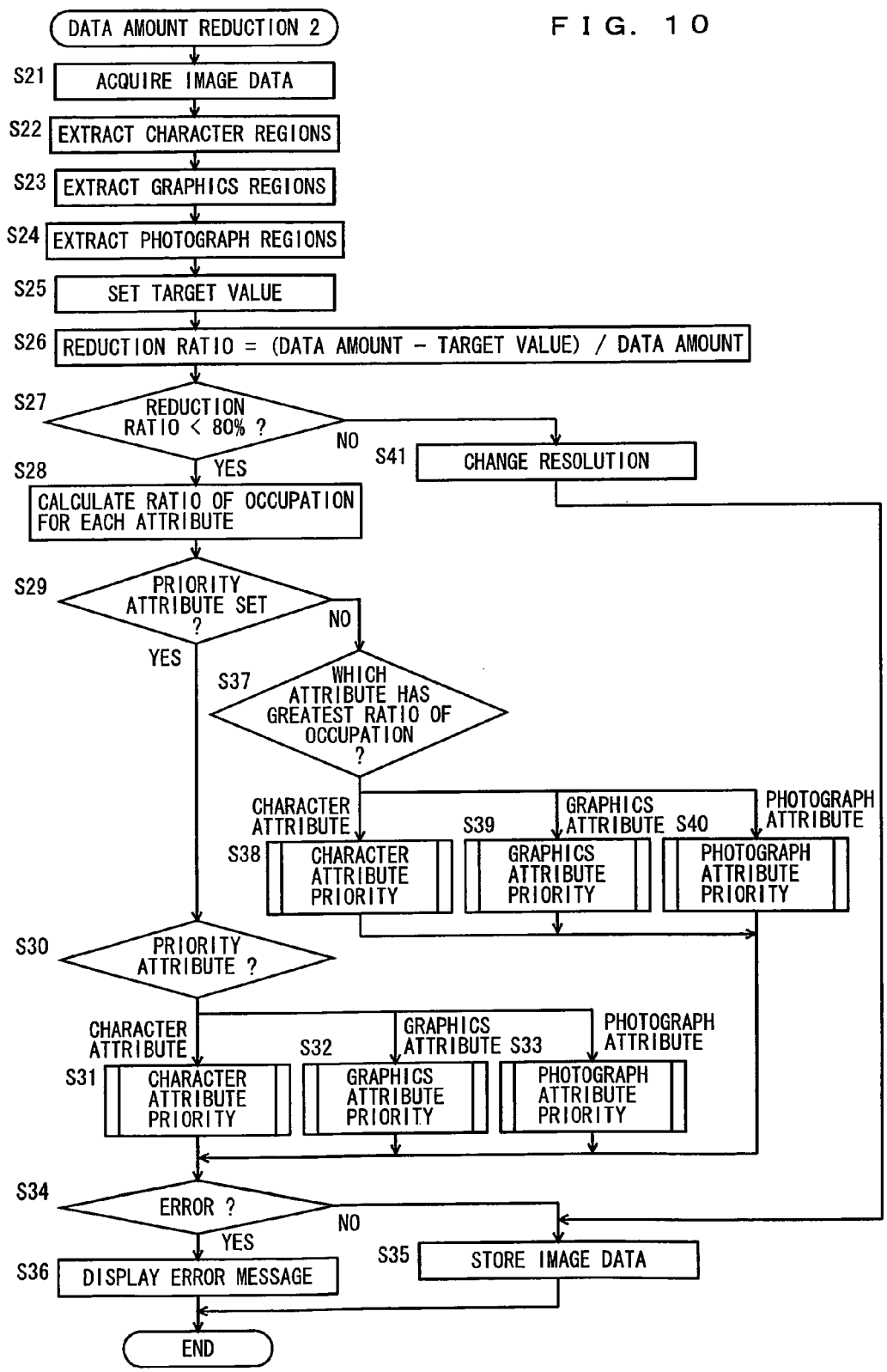
FIG. 10 is a flowchart illustrating an example of the flow of the data amount reduction process according to the modification.

FIG. 10 is a flowchart illustrating an example of the flow of the data amount reduction process according to the modification. The data amount reduction process of the modification is carried out by image processing portion 30 as image processing portion 30 executes the data amount reducing program. Referring to FIG. 10, steps S21 to S27 are identical to steps S01 to S07 in FIG. 7, and thus, description thereof will not be repeated here. In step S41, the resolution of the image data is changed, as in step S16 shown in FIG. 7, and the process proceeds to step S35.

In step S28, the ratio of occupation is calculated for each attribute. Specifically, the ratio of a sum total area of the character regions having the character attribute to the entire area of the image data is calculated as the ratio of occupation of the character attribute, the ratio of a sum total area of the graphics regions having the graphics attribute to the entire area of the image data is calculated as the ratio of occupation of the graphics attribute, and the ratio of a sum total area of the photograph regions having the photograph attribute to the entire area of the image data is calculated as the ratio of occupation of the photograph attribute.

In the following step S29, it is determined whether an attribute which is to be given priority ("priority attribute") has been set. Specifically, it is determined whether check box 207 in field 203 in the option setting screen shown in FIG. 9 has been checked and an attribute which is to be given priority in terms of image quality has been set. If check box 207 has been checked and one of "character region priority", "photograph region priority" and "graphics region priority" has been selected, then it is determined that a priority attribute has been set. If it is determined that the priority attribute has been set, the process proceeds to step S30; otherwise, the process proceeds to step S37.

In step S30, the process branches in accordance with the priority attribute being set. If it has been set to give priority to the character attribute, the process proceeds to step S31. If it has been set to give priority to the graphics attribute, the process proceeds to step S32. If it has been set to give priority to the photograph attribute, the process proceeds to step S33.

In step S31, a character attribute priority process is carried out, and the process proceeds to step S34. The character attribute priority process, which will be described later in detail, is the process of reducing the data amount of the image data while giving priority to the character attribute. The process returns an error as a return value if it failed to reduce the data amount down to the target value. In step S32, a graphics attribute priority process is carried out, and the process proceeds to step S34. The graphics attribute priority process, which will be described later in detail, is the process of reducing the data amount of the image data while giving priority to the graphics attribute. The process returns an error as a return value if it failed to reduce the data amount down to the target value. In step S33, a photograph attribute priority process is carried out, and the process proceeds to step S34. The photograph attribute priority process, which will be described later in detail, is the process of reducing the data amount of the image data while giving priority to the photograph attribute. The process returns an error as a return value if it failed to reduce the data amount down to the target value.

In step S34, it is determined whether the return value from any of the character attribute priority process, graphics attribute priority process, and photograph attribute priority process is an error. If the return value is an error, the process proceeds to step S36; otherwise, the process proceeds to step S35. In step S35, the image data whose data amount has been reduced is stored, e.g., in HDD 116, and the process is terminated. In step S36, an error message is displayed on display portion 114, as in step S18 in FIG. 7, and the process is terminated.

On the other hand, if it is determined in step S29 that a priority attribute has not been set, in step S37, the process branches in accordance with the attribute whose ratio of occupation calculated in step S28 is the greatest. If the ratio of occupation of the character attribute is the greatest, the process proceeds to step S38. If the ratio of occupation of the graphics attribute is the greatest, the process proceeds to step S39. If the ratio of occupation of the photograph attribute is the greatest, the process proceeds to step S40. In step S38, the character attribute priority process as in step S31 is carried out, and the process proceeds to step S34. In step S39, the graphics attribute priority process as in step S32 is carried out, and the process proceeds to step S34. In step S40, the photograph attribute priority process as in step S33 is carried out, and the process proceeds to step S34.

FIG. 11 is a flowchart illustrating an example of the flow of the character attribute priority process. The character attribute priority process is carried out in steps S31 and S38 in FIG. 10. Referring to FIG. 11, in step S51, it is determined whether the ratio of occupation of the graphics attribute is greater than the ratio of occupation of the photograph attribute. If so, the process proceeds to step S52; otherwise, the process proceeds to step S61.

In step S52, a photograph attribute data amount reduction process is carried out, and the process proceeds to step S53. The photograph attribute data amount reduction process, which will be described later in detail, is the process in which the photograph regions having the photograph attribute in the image data are sequentially subjected to tone reduction. In step S53, it is determined whether the data amount of the image data after the photograph attribute data amount reduction process has been carried out is not more than the target value. If the data amount of the image data is equal to or less than the target value, the process proceeds to step S58; otherwise, the process proceeds to step S54.

In step S54, a graphics attribute data amount reduction process is carried out, and the process proceeds to step S55. The graphics attribute data amount reduction process, which will be described later in detail, is the process in which the graphics regions having the graphics attribute in the image data are sequentially subjected to tone reduction. In step S55, it is determined whether the data amount of the image data after the graphics attribute data amount reduction process has been carried out is not more than the target value. If the data amount of the image data is equal to or less than the target value, the process proceeds to step S58; otherwise, the process proceeds to step S56.

Meanwhile, in step S61, the graphics attribute data amount reduction process as in step S54 is carried out, and the process proceeds to step S62. In step S62, it is determined whether the data amount of the image data after the graphics attribute data amount reduction process has been carried out is not more than the target value. If the data amount of the image data is equal to or less than the target value, the process proceeds to step S58; otherwise, the process proceeds to step S63.

In step S63, the photograph attribute data amount reduction process as in step S52 is carried out, and the process proceeds to step S64. In step S64, it is determined whether the data amount of the image data after the photograph attribute data amount reduction process has been carried out is not more than the target value. If the data amount of the image data is equal to or less than the target value, the process proceeds to step S58; otherwise, the process proceeds to step S56.

In step S56, a character attribute data amount reduction process is carried out, and the process proceeds to step S57. The character attribute data amount reduction process, which will be described later in detail, is the process in which the character regions having the character attribute in the image data are sequentially subjected to binarization. In step S57, it is determined whether the data amount of the image data after the character attribute data amount reduction process has been carried out is not more than the target value. If the data amount of the image data is equal to or less than the target value, the process proceeds to step S58; otherwise, the process proceeds to step S59.

In step S58, a return value is set to "normal", and the process returns to the data amount reduction process shown in FIG. 10. In step S59, the return value is set to "error", and the process returns to the data amount reduction process shown in FIG. 10.

According to the character attribute priority process, binarization of the character regions having the character attribute is carried out only after tone reduction of either or both of the graphics regions and the photograph regions. That is, if the data amount of the image data becomes equal to or less than the target value through tone reduction of either or both of the graphics regions and the photograph regions, the character regions are not subjected to binarization. This can prevent degradation of image quality of the character regions as much as possible.

Figure 12:
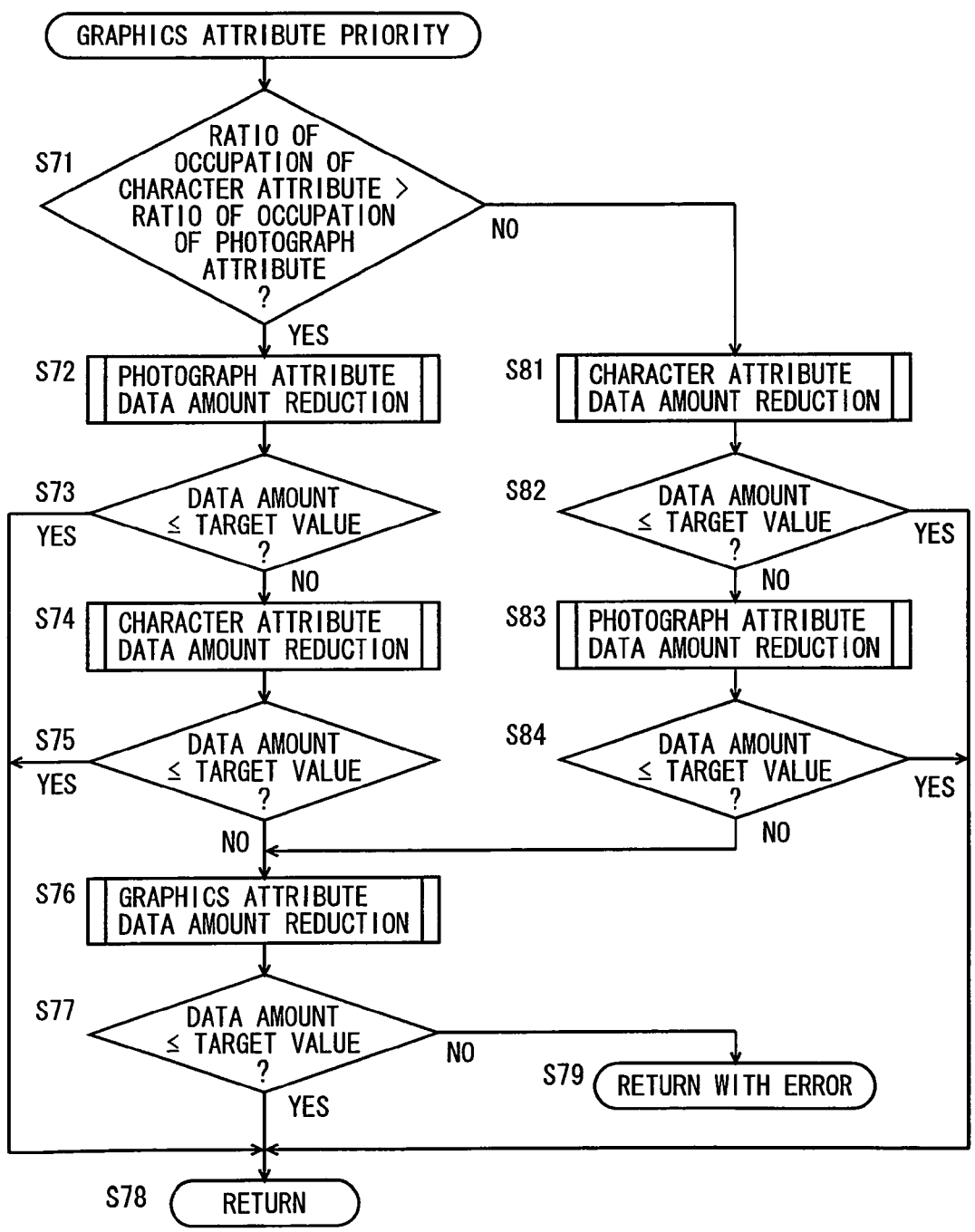
FIG. 12 is a flowchart illustrating an example of the flow of a graphics attribute priority process.

FIG. 12 is a flowchart illustrating an example of the flow of the graphics attribute priority process. The graphics attribute priority process is carried out in steps S32 and S39 in FIG. 10. Referring to FIG. 12, in step S71, it is determined whether the ratio of occupation of the character attribute is greater than the ratio of occupation of the photograph attribute. If so, the process proceeds to step S72; otherwise, the process proceeds to step S81.

In step S72, the photograph attribute data amount reduction process is carried out, and the process proceeds to step S73. In step S73, it is determined whether the data amount of the image data after the photograph attribute data amount reduction process has been carried out is not more than the target value. If the data amount of the image data is equal to or less than the target value, the process proceeds to step S78; otherwise, the process proceeds to step S74.

In step S74, the character attribute data amount reduction process is carried out, and the process proceeds to step S75. In step S75, it is determined whether the data amount of the image data after the character attribute data amount reduction process has been carried out is not more than the target value. If the data amount of the image data is equal to or less than the target value, the process proceeds to step S78; otherwise, the process proceeds to step S76.

Meanwhile, in step S81, the character attribute data amount reduction process as in step S74 is carried out, and the process proceeds to step S82. In step S82, it is determined whether the data amount of the image data after the character attribute data amount reduction process has been carried out is not more than the target value. If the data amount of the image data is equal to or less than the target value, the process proceeds to step S78; otherwise, the process proceeds to step S83.

In step S83, the photograph attribute data amount reduction process as in step S72 is carried out, and the process proceeds to step S84. In step S84, it is determined whether the data amount of the image data after the photograph attribute data amount reduction process has been carried out is not more than the target value. If the data amount of the image data is equal to or less than the target value, the process proceeds to step S78; otherwise, the process proceeds to step S76.

In step S76, the graphics attribute data amount reduction process is carried out, and the process proceeds to step S77. In step S77, it is determined whether the data amount of the image data after the graphics attribute data amount reduction process has been carried out is not more than the target value. If the data amount of the image data is equal to or less than the target value, the process proceeds to step S78; otherwise, the process proceeds to step S79.

In step S78, a return value is set to "normal", and the process returns to the data amount reduction process shown in FIG. 10. In step S79, the return value is set to "error", and the process returns to the data amount reduction process shown in FIG. 10.

According to the graphics attribute priority process, tone reduction of the graphics regions having the graphics attribute is carried out only after either or both of binarization of the character regions and tone reduction of the photograph regions. That is, if the data amount of the image data becomes equal to or less than the target value through either or both of binarization of the character regions and tone reduction of the photograph regions, the graphics regions are not subjected to tone reduction. Accordingly, degradation of image quality of the graphics regions can be prevented as much as possible.

Figure 13:
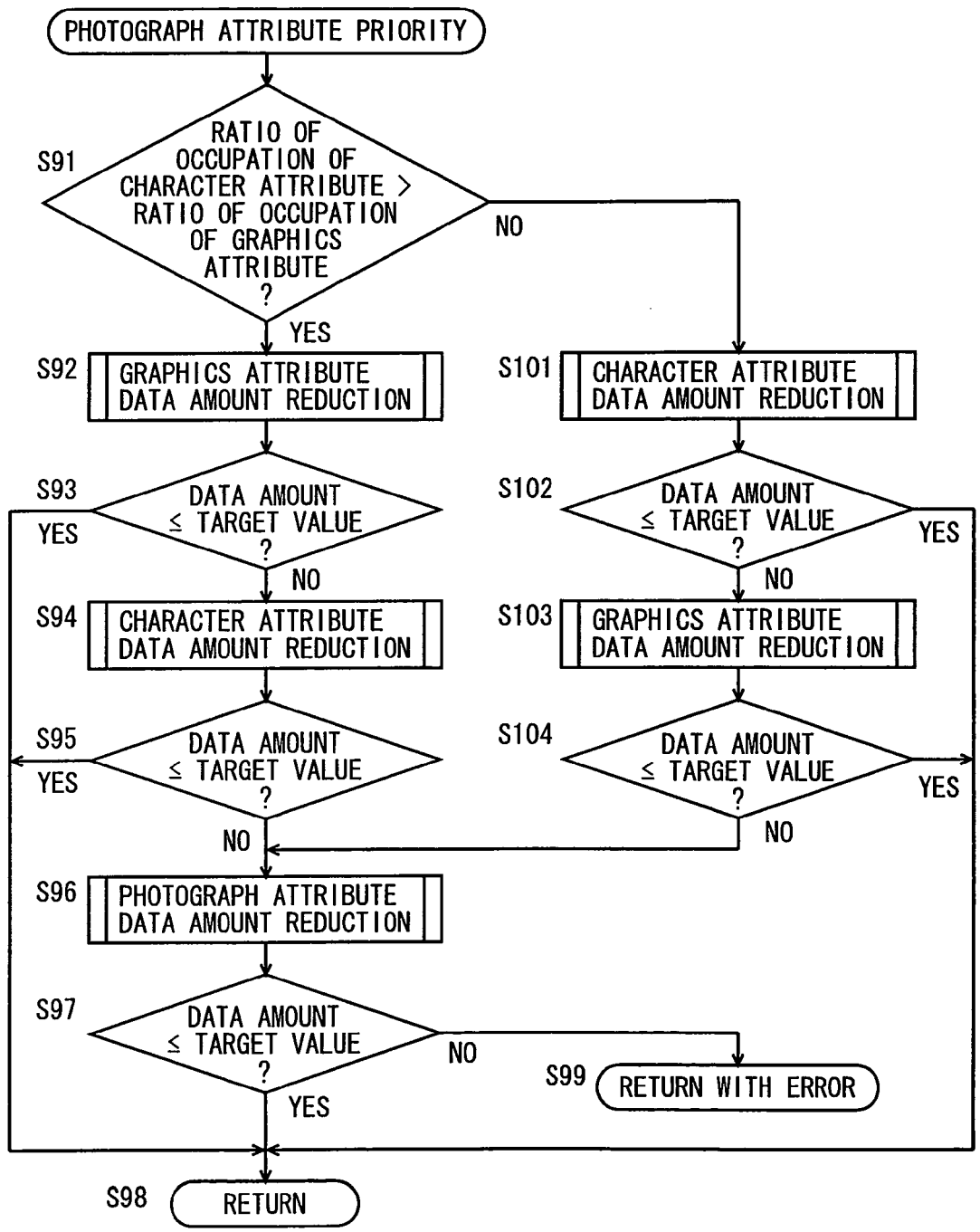
FIG. 13 is a flowchart illustrating an example of the flow of a photograph attribute priority process.

FIG. 13 is a flowchart illustrating an example of the flow of the photograph attribute priority process. The photograph attribute priority process is carried out in steps S33 and S40 in FIG. 10. Referring to FIG. 13, in step S91, it is determined whether the ratio of occupation of the character attribute is greater than the ratio of occupation of the graphics attribute. If so, the process proceeds to step S92; otherwise, the process proceeds to step S101.

In step S92, the graphics attribute data amount reduction process is carried out, and the process proceeds to step S93. In step S93, it is determined whether the data amount of the image data after the graphics attribute data amount reduction process has been carried out is not more than the target value. If the data amount of the image data is equal to or less than the target value, the process proceeds to step S98; otherwise, the process proceeds to step S94.

In step S94, the character attribute data amount reduction process is carried out, and the process proceeds to step S95. In step S95, it is determined whether the data amount of the image data after the character attribute data amount reduction process has been carried out is not more than the target value. If the data amount of the image data is equal to or less than the target value, the process proceeds to step S98; otherwise, the process proceeds to step S96.

Meanwhile, in step S101, the character attribute data amount reduction process as in step S94 is carried out, and the process proceeds to step S102. In step S102, it is determined whether the data amount of the image data after the character attribute data amount reduction process has been carried out is not more than the target value. If the data amount of the image data is equal to or less than the target value, the process proceeds to step S98; otherwise, the process proceeds to step S103.

In step S103, the graphics attribute data amount reduction process as in step S92 is carried out, and the process proceeds to step S104. In step S104, it is determined whether the data amount of the image data after the graphics attribute data amount reduction process has been carried out is not more than the target value. If the data amount of the image data is equal to or less than the target value, the process proceeds to step S98; otherwise, the process proceeds to step S96.

In step S96, the photograph attribute data amount reduction process is carried out, and the process proceeds to step S97. In step S97, it is determined whether the data amount of the image data after the photograph attribute data amount reduction process has been carried out is not more than the target value. If the data amount of the image data is equal to or less than the target value, the process proceeds to step S98; otherwise, the process proceeds to step S99.

In step S98, a return value is set to "normal", and the process returns to the data amount reduction process shown in FIG. 10. In step S99, the return value is set to "error", and the process returns to the data amount reduction process shown in FIG. 10.

According to the photograph attribute priority process, tone reduction of the photograph regions having the photograph attribute is carried out only after either or both of binarization of the character regions and tone reduction of the graphics regions. That is, if the data amount of the image data becomes equal to or less than the target value through either or both of binarization of the character regions and tone reduction of the graphics regions, the photograph regions are not subjected to tone reduction. Accordingly, degradation of image quality of the photograph regions can be prevented as much as possible.

Figure 14:
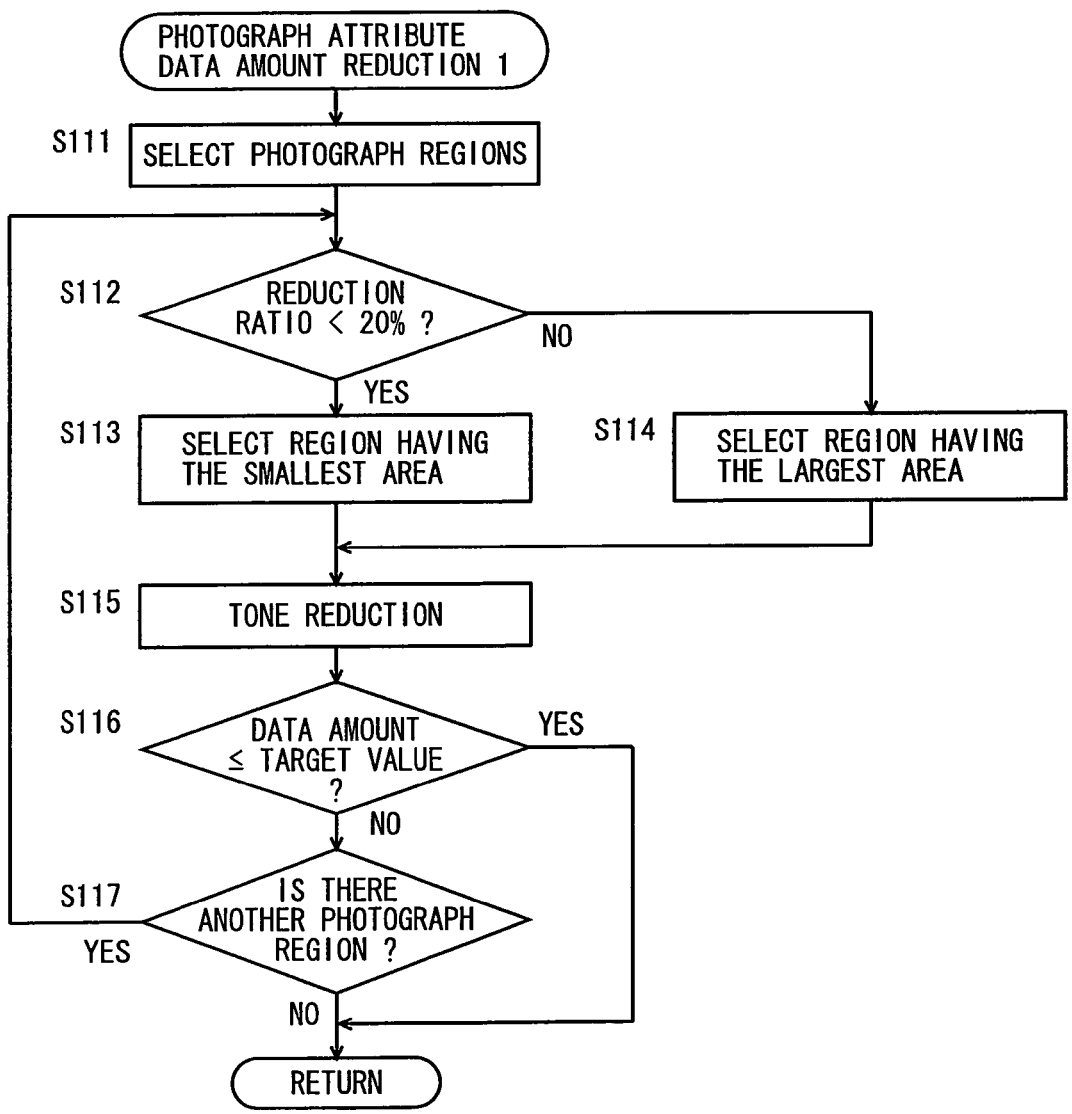
FIG. 14 is a first flowchart illustrating an example of the flow of a photograph attribute data amount reduction process.

FIG. 14 is a first flowchart illustrating an example of the flow of the photograph attribute data amount reduction process. The photograph attribute data amount reduction process is carried out in steps S52 and S63 in FIG. 11, in steps S72 and S83 in FIG. 12, and in step S96 in FIG. 13. Referring to FIG. 14, the photograph regions having the photograph attribute are selected as targets to be processed (step S111). Specifically, of the plurality of regions extracted from the image data, only the regions having the photograph attribute are selected as the process targets.

In the following step S112, it is determined whether the reduction ratio is less than 20%. If the reduction ratio is less than 20%, the process proceeds to step S113; otherwise, the process proceeds to step S114. In step S113, of the photograph regions selected in step S111, the one having the smallest area is selected, and the process proceeds to step S115. In step S114, of the photograph regions selected in step S111, the one having the largest area is selected, and the process proceeds to step S115.

In step S115, the photograph region selected in step S113 or S114 is subjected to tone reduction. In this manner, part of the image data is reduced in tone, whereby the data amount is reduced. In the following step S116, it is determined whether the data amount of the image data after the tone reduction has been carried out is not more than the target value. If the data amount is equal to or less than the target value, the process returns to the character attribute priority process shown in FIG. 11, the graphics attribute priority process shown in FIG. 12, or the photograph attribute priority process shown in FIG. 13. If the data amount is greater than the target value, the process proceeds to step S117.

In step S117, it is determined whether there is another photograph region to be selected as a process target. If there is a photograph region yet to be processed, the process returns to step S112; otherwise, the process returns to the character attribute priority process shown in FIG. 11, the graphics attribute priority process shown in FIG. 12, or the photograph attribute priority process shown in FIG. 13.

Figure 15:
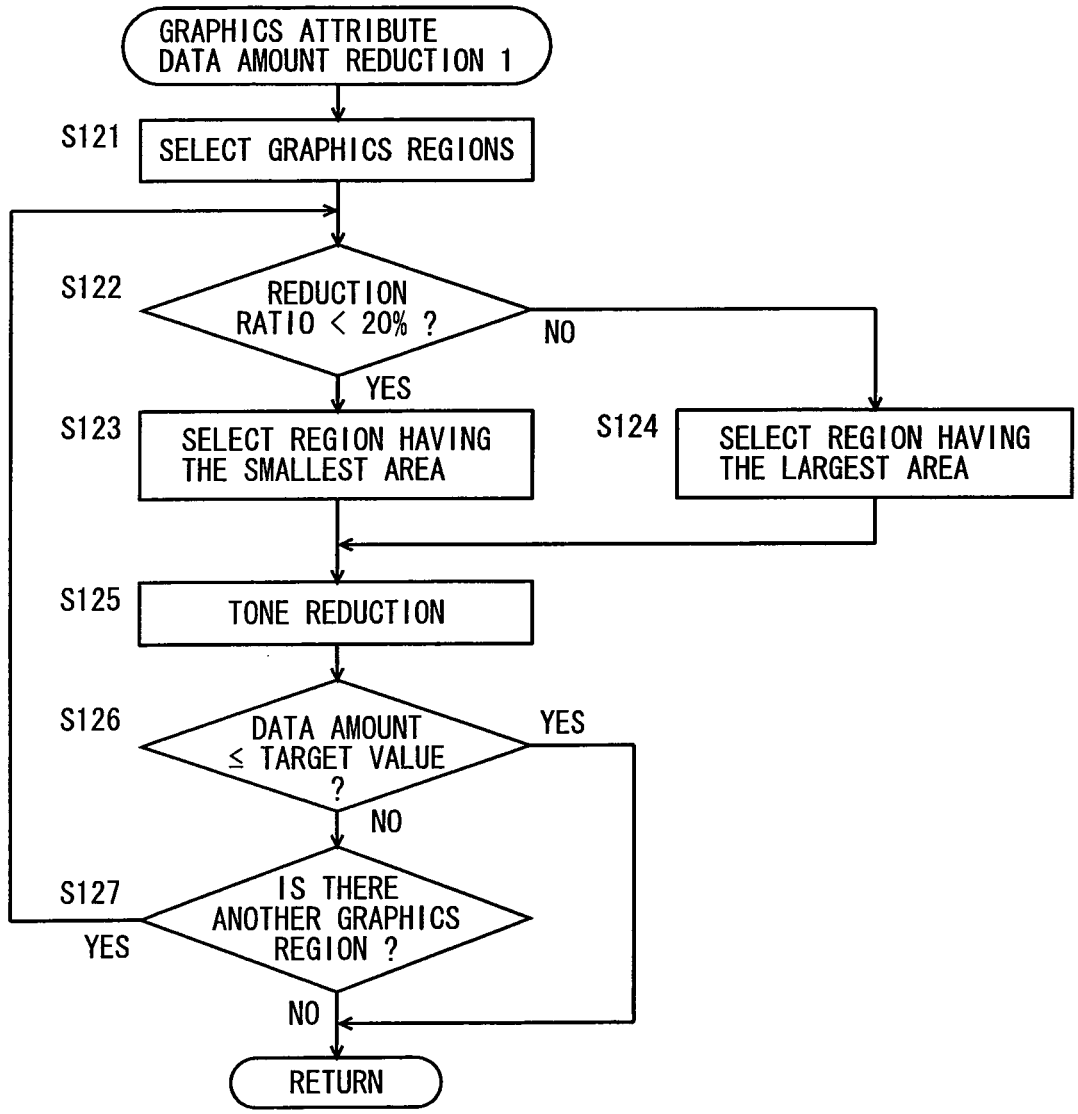
FIG. 15 is a first flowchart illustrating an example of the flow of a graphics attribute data amount reduction process.

FIG. 15 is a first flowchart illustrating an example of the flow of the graphics attribute data amount reduction process. The graphics attribute data amount reduction process is carried out in steps S54 and S61 in FIG. 11, in step S76 in FIG. 12, and in steps S92 and S103 in FIG. 13. Referring to FIG. 15, the graphics regions having the graphics attribute are selected as targets to be processed (step S121). Specifically, of the plurality of regions extracted from the image data, only the regions having the graphics attribute are selected as the process targets.

In the following step S122, it is determined whether the reduction ratio is less than 20%. If the reduction ratio is less than 20%, the process proceeds to step S123; otherwise, the process proceeds to step S124. In step S123, of the graphics regions selected in step S121, the one having the smallest area is selected, and the process proceeds to step S125. In step S124, of the graphics regions selected in step S121, the one having the largest area is selected, and the process proceeds to step S125.

In step S125, the graphics region selected in step S123 or S124 is subjected to tone reduction. In this manner, part of the image data is reduced in tone, whereby the data amount is reduced. In the following step S126, it is determined whether the data amount of the image data after the tone reduction has been carried out is not more than the target value. If the data amount is equal to or less than the target value, the process returns to the character attribute priority process shown in FIG. 11, the graphics attribute priority process shown in FIG. 12, or the photograph attribute priority process shown in FIG. 13. If the data amount is greater than the target value, the process proceeds to step S127.

In step S127, it is determined whether there is another graphics region to be selected as a process target. If there is a graphics region yet to be processed, the process returns to step S122; otherwise, the process returns to the character attribute priority process shown in FIG. 11, the graphics attribute priority process shown in FIG. 12, or the photograph attribute priority process shown in FIG. 13.

Figure 16:
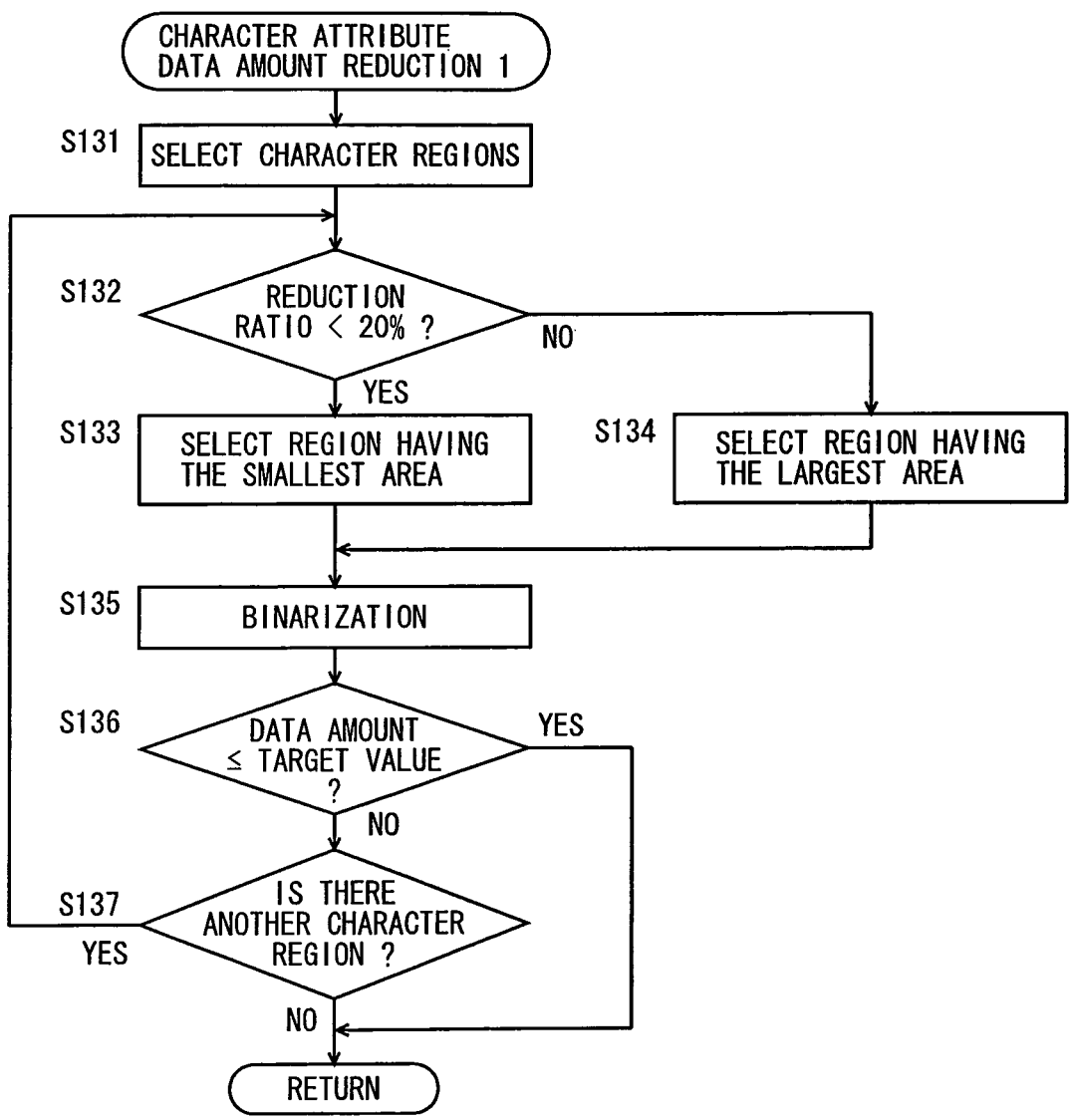
FIG. 16 is a first flowchart illustrating an example of the flow of a character attribute data amount reduction process.

FIG. 16 is a first flowchart illustrating an example of the flow of the character attribute data amount reduction process. The character attribute data amount reduction process is carried out in step S56 in FIG. 11, in steps S74 and S81 in FIG. 12, and in steps S94 and S101 in FIG. 13. Referring to FIG. 16, the character regions having the character attribute are selected as targets to be processed (step S131). Specifically, of the plurality of regions extracted from the image data, only the regions having the character attribute are selected as the process targets.

In the following step S132, it is determined whether the reduction ratio is less than 20%. If the reduction ratio is less than 20%, the process proceeds to step S133; otherwise, the process proceeds to step S134. In step S133, of the character regions selected in step S131, the one having the smallest area is selected, and the process proceeds to step S135. In step S134, of the character regions selected in step S131, the one having the largest area is selected, and the process proceeds to step S135.

In step S135, the character region selected in step S133 or S134 is subjected to binarization. In this manner, part of the image data is binarized, whereby the data amount is reduced.

In the following step S136, it is determined whether the data amount of the image data after the binarization has been carried out is not more than the target value. If the data amount is equal to or less than the target value, the process returns to the character attribute priority process shown in FIG. 11, the graphics attribute priority process shown in FIG. 12, or the photograph attribute priority process shown in FIG. 13. If the data amount is greater than the target value, the process proceeds to step S137.

In step S137, it is determined whether there is another character region to be selected as a process target. If there is a character region yet to be processed, the process returns to step S132; otherwise, the process returns to the character attribute priority process shown in FIG. 11, the graphics attribute priority process shown in FIG. 12, or the photograph attribute priority process shown in FIG. 13.

<Modification of Data Amount Reduction Process>

In the data amount reduction process described above, it has been determined so that a region to be processed is selected from among a plurality of regions sequentially in either a descending order or an ascending order of area occupied by each region, depending on the reduction ratio. In the data amount reduction process according to a modification, for the photograph regions having the photograph attribute and for the graphics regions having the graphics attribute, a region to be processed is selected in descending order of the number of similar colors included in the respective regions, and for the character regions having the character attribute, a region to be processed is selected in descending order of size of the characters included in the respective regions. That the regions are selected in descending order of the number of similar colors included therein means that a region to be processed is selected sequentially from the one in which, among a plurality of colors (pixel values) possessed by the respective pixels included in that region, the number of colors falling within a range where the colors can be combined into one color, or, the number of different pixel values falling within a predetermined pixel value range, is the largest.

Figure 17:
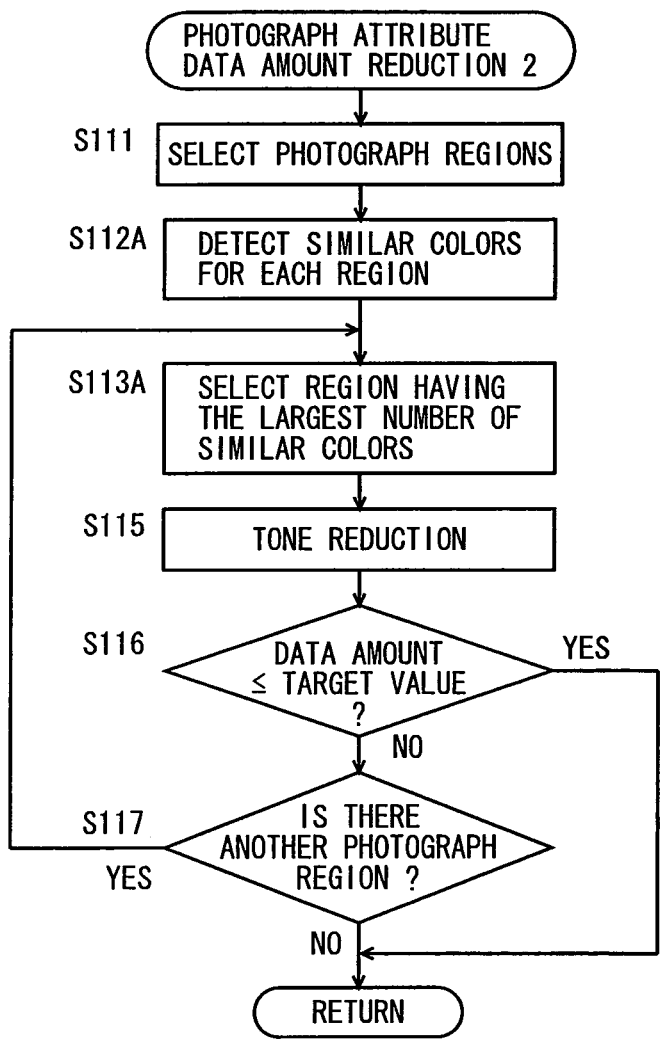
FIG. 17 is a second flowchart illustrating another example of the flow of the photograph attribute data amount reduction process.

FIG. 17 is a second flowchart illustrating another example of the flow of the photograph attribute data amount reduction process. The photograph attribute data amount reduction process shown in FIG. 17 differs from that shown in FIG. 14 in that steps S112 and S113 have been changed to steps S112A and S113A, respectively, and that step S114 has been deleted. The remaining steps are identical to those in FIG. 14, and thus, description thereof will not be repeated here.

In step S112A, similar colors are detected for each of the photograph regions. In the following step S113A, the region in which the number of similar colors is the largest is selected, and the process proceeds to step S115. When tone reduction is performed on the photograph region including the large number of similar colors, a high reduction ratio of the data amount is achieved, and at the same time, the changes in the images before and after the tone reduction are indistinguishable. As such, tone reduction is performed on the photograph regions in descending order of the data amount reduction ratio. This enables efficient reduction of the data amount.

Figure 18:
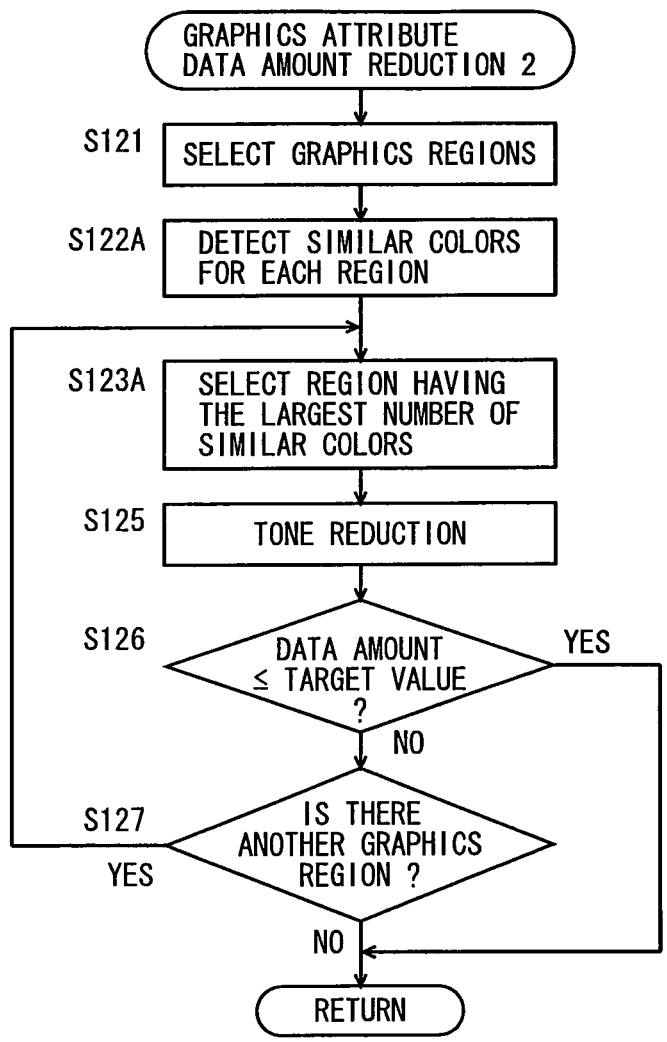
FIG. 18 is a second flowchart illustrating another example of the flow of the graphics attribute data amount reduction process.

FIG. 18 is a second flowchart illustrating another example of the flow of the graphics attribute data amount reduction process. The graphics attribute data amount reduction process shown in FIG. 18 differs from that shown in FIG. 15 in that steps S122 and S123 have been changed to steps S122A and S123A, respectively, and that step S124 has been deleted. The remaining steps are identical to those in FIG. 15, and thus, description thereof will not be repeated here.

In step S122A, similar colors are detected for each of the graphics regions. In the following step S123A, the region in which the number of similar colors is the largest is selected, and the process proceeds to step S125. When tone reduction is performed on the graphics region including the large number of similar colors, a high reduction ratio of the data amount is achieved. As such, tone reduction is performed on the graphics regions in descending order of the data amount reduction ratio, which enables efficient reduction of the data amount.

Figure 19:
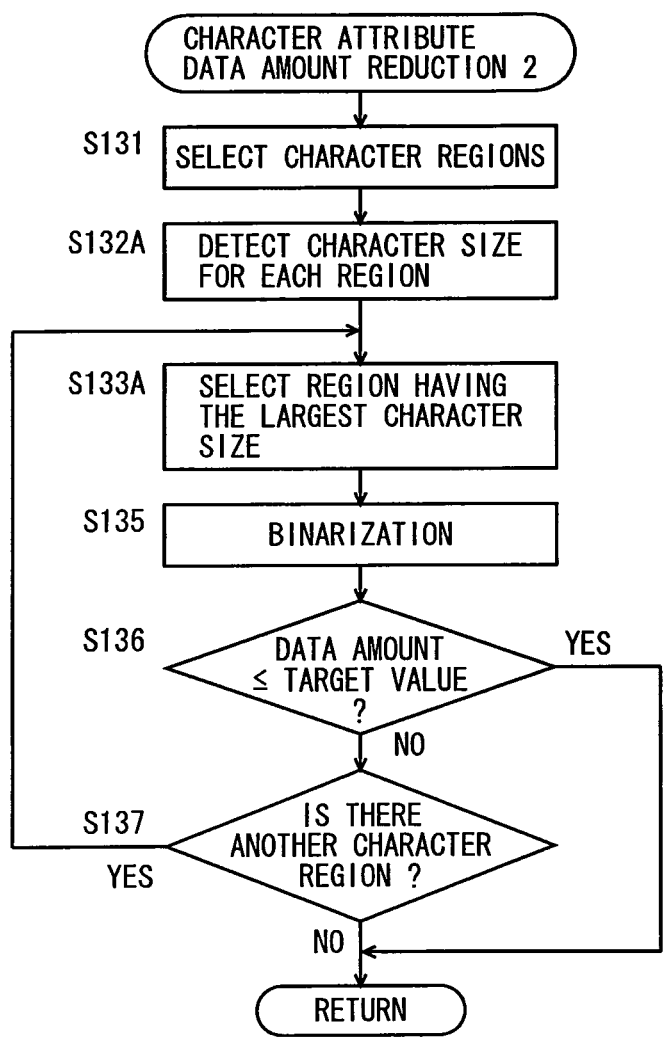
FIG. 19 is a second flowchart illustrating another example of the flow of the character attribute data amount reduction process.

FIG. 19 is a second flowchart illustrating another example of the flow of the character attribute data amount reduction process. The character attribute data amount reduction process shown in FIG. 19 differs from that shown in FIG. 16 in that steps S132 and S133 have been changed to steps S132A and S133A, respectively, and that step S134 has been deleted. The remaining steps are identical to those in FIG. 16, and thus, description thereof will not be repeated here.

In step S132A, the size of the characters is detected for each of the character regions. In the following step S133A, the region in which the character size is the largest is selected, and the process proceeds to step S135. When binarization is performed on the character region in which the character size is small, the characters may become blurred and illegible. Thus, binarization is performed on the character regions in descending order of the character size, so as not to perform binarization on the regions including the characters of smaller sizes as much as possible, to thereby prevent the characters from being blurred or illegible. Alternatively, it may be configured such that binarization is performed on only the regions having the character sizes of not smaller than a predetermined size, so as not to perform binarization on the character regions in which the character sizes are smaller than the predetermined size.

As described above, according to MFP 100 as the image processing apparatus of the present embodiment, in order to reduce the data amount of the image data to a level not greater than a target value set by a user, a region is selected sequentially from the character regions, graphics regions, and photograph regions extracted from the image data, and the selected region is subjected to binarization in the case of the character region, or to tone reduction in the case of the graphics or photograph region, until the data amount of the image data becomes equal to or less than the target value. In this manner, only part of the image data is subjected to binarization or tone reduction. Although the image quality would be degraded in the part subjected to binarization or tone reduction in the image data, good image quality is maintained in the rest of the image data. Furthermore, the data amount of the image data close to the target value is achieved.

In the case where the ratio (reduction ratio) of the data amount of the acquired image data with respect to the target value is small, the regions to be subjected to binarization or tone reduction may be selected in ascending order of area, so that the portion suffering degradation of image quality can be made as small as possible. In this manner, the image quality can be given priority. On the other hand, in the case where the reduction ratio is large, the regions to be subjected to binarization or tone reduction may be selected in descending order of area. In this manner, the process efficiency can be given priority.

Further, the order of selecting an attribute from among the character, graphics, and photograph attributes may be determined and the attributes may be selected in the determined order. Then, the regions may be subjected to binarization or tone reduction sequentially from those having the selected attribute. As such, the attributes can be divided into those which will suffer degradation of image quality and those which will not suffer degradation of image quality. Furthermore, the attribute designated by the user may be given priority, and the regions having the attributes which have not been designated by the user may be preferentially subjected to binarization or tone reduction. This can prevent the regions having the attribute designated by the user from suffering degradation of image quality.

Still further, an attribute may be selected from among the character, graphics, and photograph attributes sequentially in ascending order of ratio of occupation of the attribute. That is, the image quality will be degraded sequentially from the regions having the attribute whose ratio of occupation is smaller. Accordingly, the regions having the attribute whose ratio of occupation is large can be prevented from suffering degradation of image quality. This can reduce the area in which image quality is degraded.

In the case where there are a plurality of character regions, they may be subjected to binarization in descending order of size of the characters included therein. In the case where there are a plurality of graphics or photograph regions, they may be subjected to tone reduction in descending order of the number of similar colors included therein. According to this aspect, the character regions having small character sizes are prevented from suffering degradation of image quality, so that the characters are prevented from being blurred and illegible. Further, the photograph regions or the graphics regions having a greater number of similar colors are preferentially subjected to tone reduction. This can increase the efficiency in reducing the data amount, and also suppress degradation of image quality due to the tone reduction.

In the above embodiment, part of the image data is subjected to tone reduction so as to reduce the data amount of the graphics regions having the graphics attribute and/or the photograph regions having the photograph attribute. In place thereof, or in addition thereto, part of the image data may be subjected to JPEG compression, or resolution may be changed. Further, in the data amount reduction process described above, it has been assumed that bitmap image data is generated. Alternatively, bitmap image data may be separated into images having only the graphics or photograph regions and images having only the character regions, and the images having only the graphics or photograph regions may be subjected to JPEG compression or the like, while the images having only the character regions may be subjected to MMR compression or the like, and thereafter, the two pieces of separately compressed data may be combined into one piece of data.

Still further, in the above embodiment, the attributes have been selected. Alternatively, it may be configured such that the user designates a region to be subjected to binarization or tone reduction, and the character regions, graphics regions, and photograph regions included in the region designated by the user may be subjected to binarization or tone reduction. This configuration allows the user to designate the portion the user thinks to be unimportant, and accordingly, degradation of image quality of the portion the user thinks to be important can be prevented.

While MFP 100 has been described as an example of the image processing apparatus in the above embodiment, the image processing apparatus may be a scanner, printer, computer, or any other apparatus as long as it has the image data processing function. Further, the present invention may of course be understood as a data amount reducing method for causing MFP 100 or another image processing apparatus to carry out the processing shown in FIG. 7 or FIGS. 10 to 19, or a data amount reducing program for causing a computer to carry out the data amount reducing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   an image data acquiring portion to acquire image data;
   a region extracting portion to extract one or more regions having a predetermined attribute from said acquired image data;
   a selecting portion to select one region from among one or more regions extracted by said region extracting portion;
   a reduction portion to reduce a data amount of said image data by processing said selected region in a manner predetermined for the attribute of the region;
   a comparing portion to compare the data amount of the image data after the data amount has been reduced by said reduction portion with a predetermined target value;
   said selecting portion selecting one region from among said plurality of regions sequentially until said comparing portion determines that the data amount of the image data is not more than said target value; and
   a reduction ratio calculating portion to calculate a ratio of data reduction amount based on the data amount of said acquired image data and said target value, wherein
   said selecting portion includes a selecting order determining portion to determine the order of selecting one region from among said extracted regions on the basis of said calculated ratio.

2. The image processing apparatus according to claim 1, wherein said selecting order determining portion determines so that the regions are selected in ascending order of area occupied by each region in the case where said calculated ratio is smaller than a predetermined value, and determines so that the regions are selected in descending order of area occupied by each region in the case where said calculated ratio is not smaller than said predetermined value.

3. The image processing apparatus according to claim 1, wherein
   said region extracting portion extracts a plurality of regions each having one of a plurality of predetermined attributes,
   said selecting portion includes
      an attribute selecting order determining portion to determine the order of selecting one attribute from among said plurality of attributes, and
      an attribute selecting portion to select one attribute from among said plurality of attributes in accordance with said determined order, and
   said selecting portion selects one region having said selected attribute from among said extracted regions.

4. The image processing apparatus according to claim 3, wherein said attribute selecting order determining portion gives priority to an attribute designated by a user from among said plurality of attributes, and preferentially selects the remainder of the attributes not designated by the user.

5. The image processing apparatus according to claim 4, wherein
   said selecting order determining portion, in the case where there are a plurality of regions having said selected attribute, determines the order of selecting one region from among the plurality of regions having said selected attribute on the basis of said calculated ratio.

6. The image processing apparatus according to claim 5, wherein said selecting order determining portion determines so that the regions are selected in ascending order of area occupied by each region in the case where said calculated ratio is smaller than a predetermined value, and determines so that the regions are selected in descending order of area occupied by each region in the case where said calculated ratio is not smaller than said predetermined value.

7. The image processing apparatus according to claim 4, wherein said selecting order determining portion, in the case where there are a plurality of regions having said selected attribute, determines so that the regions are selected in descending order of size of a character included in each region in the case where said selected attribute is a character attribute indicating a region including a character, and determines so that the regions are selected in descending order of the number of similar colors included in each region in the case where said selected attribute is a graphics attribute indicating a region including a graphic pattern or a photograph attribute indicating a region including a photograph.

8. The image processing apparatus according to claim 3, wherein said attribute selecting order determining portion calculates a sum total area for each of said plurality of attributes by summing up areas of the regions having the same attribute among said extracted regions, and determines so that said attributes are selected in ascending order of ratio of the sum total area for each attribute with respect to an entire area of said image data.

9. The image processing apparatus according to claim 8, wherein
said selecting order determining portion, in the case where there are a plurality of regions having said selected attribute, determines the order of selecting one region from among the plurality of regions having said selected attribute on the basis of said calculated ratio.

10. The image processing apparatus according to claim 9, wherein said selecting order determining portion determines so that the regions are selected in ascending order of area occupied by each region in the case where said calculated ratio is smaller than a predetermined value, and determines so that the regions are selected in descending order of area occupied by each region in the case where said calculated ratio is not smaller than said predetermined value.

11. The image processing apparatus according to claim 8, wherein said selecting order determining portion, in the case where there are a plurality of regions having said selected attribute, determines so that the regions are selected in descending order of size of a character included in each region in the case where said selected attribute is a character attribute indicating a region including a character, and determines so that the regions are selected in descending order of the number of similar colors included in each region in the case where said selected attribute is a graphics attribute indicating a region including a graphic pattern or a photograph attribute indicating a region including a photograph.

12. The image processing apparatus according to claim 1, wherein said reduction portion includes
a binarization portion to perform binarization on a region having a character attribute among said plurality of regions, the character attribute indicating a region including a character, and
a tone reduction portion to reduce the number of colors in a region having a graphics attribute or a photograph attribute among said plurality of regions, the graphics attribute indicating a region including a graphic pattern, the photograph attribute indicating a region including a photograph.

13. The image processing apparatus according to claim 1, wherein said image data acquiring portion includes a reading portion to read an original to output image data, the reading portion reading the original in accordance with a predetermined setting value.

14. A data amount reducing method, comprising the steps of:
acquiring image data;
extracting one or more regions having a predetermined attribute from said acquired image data;
selecting one region from among said extracted regions;
reducing a data amount of said image data by processing said selected region in a manner predetermined for the attribute of the region;
comparing the data amount of the image data after the data amount has been reduced in said reducing step with a predetermined target value;
repeating said selecting step and said reducing step until it is determined in said comparing step that the data amount of the image data after the data amount has been reduced is not more than said target value;
calculating a ratio of data reduction amount based on the data amount of said acquired image data and said target value,
said step of selecting a region including the step of determining the order of selecting one region from among said extracted regions on the basis of said calculated ratio; and
storing in a non-transitory storage device the image data after the data amount has been reduced.

15. The data amount reducing method according to claim 14, wherein
said step of extracting one or more regions includes the step of extracting a plurality of regions each having one of a plurality of predetermined attributes, and
said step of selecting a region includes the steps of
determining the order of selecting one attribute from among said plurality of attributes,
selecting one attribute from among said plurality of attributes in accordance with said determined order, and
selecting one region having said selected attribute from among said extracted regions.

16. The data amount reducing method according to claim 15, wherein said step of determining the order includes the steps of
giving priority to an attribute designated by a user from among said plurality of attributes, and
preferentially selecting the remainder of the attributes not designated by the user.

17. The data amount reducing method according to claim 16, wherein
said step of selecting a region further includes the step of, in the case where there are a plurality of regions having said selected attribute, determining the order of selecting one region from among the plurality of regions having said selected attribute on the basis of said calculated ratio.

18. The data amount reducing method according to claim 15, wherein said step of determining the order includes the steps of
calculating a sum total area for each of said plurality of attributes by summing up areas of the regions having the same attribute among said extracted regions, and
determining so that said attributes are selected in ascending order of ratio of the sum total area for each attribute with respect to an entire area of said image data.

19. The data amount reducing method according to claim 18, wherein said step of selecting a region further includes the step of, in the case where there are a plurality of regions having said selected attribute, determining the order of selecting one region from among the plurality of regions having said selected attribute on the basis of said calculated ratio.

20. A non-transitory computer readable recording medium storing thereon a data amount reducing program, the program causing a computer to perform the steps of:
    acquiring image data;
    extracting one or more regions having a predetermined attribute from said acquired image data;
    selecting one region from among said extracted regions;
    reducing a data amount of said image data by processing said selected region in a manner predetermined for the attribute of the region;
    comparing the data amount of the image data after the data amount has been reduced in said reducing step with a predetermined target value;
    repeating said selecting step and said reducing step until it is determined in said comparing step that the data amount of the image data after the data amount has been reduced is not more than said target value; and
    calculating a ratio of data reduction amount based on the data amount of said acquired image data and said target value, wherein
    said step of selecting a region includes the step of determining the order of selecting one region from among said extracted regions on the basis of said calculated ratio.

21. The non-transitory computer readable recording medium according to claim 20, wherein
    said step of extracting one or more regions includes the step of extracting a plurality of regions each having one of a plurality of predetermined attributes, and
    said step of selecting a region includes the steps of
        determining the order of selecting one attribute from among said plurality of attributes,
        selecting one attribute from among said plurality of attributes in accordance with said determined order, and
        selecting one region having said selected attribute from among said extracted regions.

22. The non-transitory computer readable recording medium according to claim 21, wherein said step of determining the order includes the steps of
    giving priority to an attribute designated by a user from among said plurality of attributes, and
    preferentially selecting the remainder of the attributes not designated by the user.

23. The non-transitory computer readable recording medium according to claim 22, wherein
    said step of selecting a region further includes the step of, in the case where there are a plurality of regions having said selected attribute, determining the order of selecting one region from among the plurality of regions having said selected attribute on the basis of said calculated ratio.

24. The non-transitory computer readable recording medium according to claim 21, wherein said step of determining the order includes the steps of
    calculating a sum total area for each of said plurality of attributes by summing up areas of the regions having the same attribute among said extracted regions, and
    determining so that said attributes are selected in ascending order of ratio of the sum total area for each attribute with respect to an entire area of said image data.

25. The non-transitory computer readable recording medium according to claim 24, wherein
    said step of selecting a region further includes the step of, in the case where there are a plurality of regions having said selected attribute, determining the order of selecting one region from among the plurality of regions having said selected attribute on the basis of said calculated ratio.

* * * * *